(12) United States Patent
Kadono et al.

(10) Patent No.: US 10,148,951 B2
(45) Date of Patent: Dec. 4, 2018

(54) PICTURE CODING METHOD AND PICTURE DECODING METHOD

(71) Applicant: Godo Kaisha IP Bridge 1, Tokyo (JP)

(72) Inventors: Shinya Kadono, Fukuoka (JP); Satoshi Kondo, Kyoto (JP); Makoto Hagai, Osaka (JP); Kiyofumi Abe, Osaka (JP)

(73) Assignee: GODO KAISHA IP BRIDGE 1, Tokyo (JP)

( * ) Notice: Subject to any disclaimer, the term of this patent is extended or adjusted under 35 U.S.C. 154(b) by 0 days.

(21) Appl. No.: 15/846,578

(22) Filed: Dec. 19, 2017

(65) Prior Publication Data
US 2018/0109787 A1   Apr. 19, 2018

Related U.S. Application Data

(62) Division of application No. 15/338,726, filed on Oct. 31, 2016, now Pat. No. 10,021,389, which is a (Continued)

(30) Foreign Application Priority Data

Apr. 16, 2002 (JP) ................. 2002-112787
Jul. 1, 2002 (JP) ................. 2002-192533
(Continued)

(51) Int. Cl.
*H04N 19/105* (2014.01)
*H04N 19/423* (2014.01)
(Continued)

(52) U.S. Cl.
CPC ........... *H04N 19/105* (2014.11); *G11B 27/10* (2013.01); *G11B 27/105* (2013.01);
(Continued)

(58) Field of Classification Search
None
See application file for complete search history.

(56) References Cited

U.S. PATENT DOCUMENTS

| 3,670,096 A | 6/1972 | Candy et al. |
| 5,594,736 A | 1/1997 | Tatsumi et al. |
| (Continued) | | |

FOREIGN PATENT DOCUMENTS

| CN | 1183200 A | 5/1998 |
| EP | 0 940 989 | 9/1999 |
| (Continued) | | |

OTHER PUBLICATIONS

International Search Report dated Jul. 15, 2003 in International Application No. PCT/JP03/04539.
(Continued)

*Primary Examiner* — Frederick D Bailey
(74) *Attorney, Agent, or Firm* — Wenderoth, Lind & Ponack, L.L.P

(57) ABSTRACT

In a picture coding method for generating a coded signal corresponding to each picture by coding a plurality of coded signals, a switching picture which is capable of switching a plurality of coded signals and subsequent pictures of the switching picture can refer to only a group of pictures of the same time in the coded signals. More specifically, the case where picture numbers of an adjacent picture of an S picture and the S picture are not continuous is not considered as an error.

4 Claims, 30 Drawing Sheets

Related U.S. Application Data division of application No. 14/297,941, filed on Jun. 6, 2014, now Pat. No. 9,516,307, which is a division of application No. 12/361,193, filed on Jan. 28, 2009, now Pat. No. 8,787,448, which is a division of application No. 10/478,010, filed as application No. PCT/JP03/04539 on Apr. 10, 2003, now Pat. No. 7,505,518.

(60) Provisional application No. 60/377,638, filed on May 6, 2002.

(30) Foreign Application Priority Data

| | | |
|---|---|---|
| Jul. 12, 2002 | (JP) | 2002-204718 |
| Mar. 28, 2003 | (JP) | 2003-092490 |

(51) Int. Cl.

| | |
|---|---|
| H04N 19/172 | (2014.01) |
| G11B 27/10 | (2006.01) |
| H04N 21/44 | (2011.01) |
| H04N 19/70 | (2014.01) |
| H04N 19/46 | (2014.01) |
| H04N 19/134 | (2014.01) |
| H04N 19/61 | (2014.01) |
| H04N 19/107 | (2014.01) |
| H04N 19/89 | (2014.01) |
| H04N 19/573 | (2014.01) |
| H04N 19/176 | (2014.01) |

(52) U.S. Cl.

CPC ......... *H04N 19/107* (2014.11); *H04N 19/134* (2014.11); *H04N 19/172* (2014.11); *H04N 19/423* (2014.11); *H04N 19/46* (2014.11); *H04N 19/573* (2014.11); *H04N 19/61* (2014.11); *H04N 19/70* (2014.11); *H04N 19/89* (2014.11); *H04N 21/44016* (2013.01); H04N 19/176 (2014.11)

(56) References Cited

U.S. PATENT DOCUMENTS

| | | | |
|---|---|---|---|
| 5,652,623 | A | 7/1997 | Takano |
| 5,754,728 | A | 5/1998 | Nakajima et al. |
| 6,111,915 | A | 8/2000 | Fukunaga et al. |
| 6,163,647 | A | 12/2000 | Terashima et al. |
| 6,175,595 | B1 | 1/2001 | Keesman |
| 6,205,177 | B1 | 3/2001 | Girod et al. |
| 6,282,240 | B1 | 8/2001 | Fukunaga et al. |
| 6,310,915 | B1 | 10/2001 | Wells et al. |
| 6,339,620 | B1 | 1/2002 | Yamaguchi et al. |
| 6,480,541 | B1 | 11/2002 | Girod et al. |
| RE38,569 | E | 8/2004 | Yamamoto et al. |
| 6,865,338 | B1 | 3/2005 | Boon |
| 6,895,052 | B2 | 5/2005 | Hanamura et al. |
| 7,403,660 | B2 | 7/2008 | Hannuksela |
| 2001/0028404 | A1 | 10/2001 | Fukuhara et al. |
| 2001/0036230 | A1 | 11/2001 | Sugiyama |
| 2002/0051489 | A1 | 5/2002 | Akiyoshi et al. |
| 2002/0118295 | A1 | 8/2002 | Karczewicz et al. |
| 2002/0122491 | A1 | 9/2002 | Karczewicz et al. |
| 2003/0014705 | A1 | 1/2003 | Suzuki et al. |
| 2003/0163781 | A1 | 8/2003 | Visharam et al. |

FOREIGN PATENT DOCUMENTS

| | | |
|---|---|---|
| EP | 0 982 948 A1 | 3/2000 |
| EP | 1 079 631 A1 | 2/2001 |
| JP | 10-262259 | 9/1998 |
| JP | 11-275590 | 10/1999 |
| JP | 2000-307672 | 11/2000 |
| WO | 97/37496 | 10/1997 |
| WO | 99/11063 | 3/1999 |

OTHER PUBLICATIONS

Supplementary Partial European Search Report dated May 4, 2004 in European Application No. 03 74 6443.
Supplementary European Search Report dated Feb. 22, 2005 in European Application No. 03 74 6443.
European Search Report dated Jan. 17, 2008 in European Application No. 07116298.6-2223.
Wiegand T: "Joint Model No. 1, Revision 1(JM-IRL)" ITU Study Group 16—Video Coding Experts Group, XX, XX, Dec. 3, 2001, pp. 1, 3-75, XP001086627.
VCEG Study Group 16: "Multiframe Buffering Syntax for H.26L" ITU-T SG16 Q15-I-45, Oct. 19-22, 1999, pp. 1-3, XP002278948.
Satoshi Kondo et al: "Proposal for Minor Changes to Multi-Frame Buffering Syntax for Improving Coding Efficiency of B-pictures" ISO/IEC JTC1/SC29/WG11 and ITU-T SG16 Q.6, XX, XX, 29 Jan. 29, 2002, pp. 1-10. XP002249662.
Wiegand, Thomas. "Proposed Changes to Draft for Annex U on Enhanced Reference Picture Selection". ITU Study Group 16—Video Coding Experts Group. Aug. 4, 1999. XP002278947.
Sun, Xiaoyan et al. "Improved SP Coding Technique", Joint Video Team of ISO/IEC MPEG & ITU-T VCEG. Jan. 29, 2002. XP001112955.
Miska M. Hannuksela et al., "Random Access and Time Information", Joint Video Team of ISO/IEC MPEG & ITU-T VCEG (ISO/IEC JTC1/SC29/WG11 and ITU-T SG16 Q.6), Mar. 1, 2002, pp. 1-7.
Official Communication (Summons to attend oral proceedings) dated Nov. 3, 2010 in corresponding European Application No. 07 116 298.6.
Thomas Wiegand, "Multiframe Buffering Syntax for H.26L", ITU—Telecommunications Standardization Sector, Study Group 16, Video Coding Experts Group, Aug. 4, 1999, XP-002278948.
Extended European Search Report dated Jan. 31, 2011 in corresponding European Application No. 10 18 0940.
Gary Sullivan, "Draft Text of Recommendation H.263 Version 2 ("H.263+") for Decision", ITU-T Draft Recommendation H.263 Version 2, Jan. 27, 1998, pp. 1-153, XP000982914.
Office Action dated Oct. 5, 2011 in U.S. Appl. No. 11/979,008.
Official Communication dated Dec. 9, 2011 in corresponding European Application No. 10 180 917.6.
Miska M. Hannuksela, "Random Access and Time Information Appendix A. Proposed Changes to Joint Model", JVT-B109, XP030005106, Joint Video Team (JVT) of ISO/IEC MPEG & ITU-T VCEG (ISO/IEC JTC1/SC29/WG11 and ITU-T SG16 Q.6), 2nd Meeting: Geneva, CH, Jan. 29, 2002-Feb. 1, 2002, pp. 1-8.
Office Action dated Mar. 21, 2012 in U.S. Appl. No. 11/979,008.
European Office Action dated Mar. 8, 2013 in corresponding European Application No. 10180940.8.
Weigand, T. et al., "Overview of the H.264/AVC video coding standard", IEEE Transactions on Circuits and Systems for Video Technology, IEEE Service Center, Piscataway, NJ, US, vol. 13, No. 7, Jul. 1, 2003 (Jul. 1, 2003), pp. 550-576.
Office Action, dated Jun. 7, 2013, issued in corresponding U.S. Appl. No. 11/979,008.
Wenger et al., "RTP payload Format for JVT Video", Internet Draft, draft-wenger-avt-rtp-jvt-00, Feb. 2002.

Fig. 3

| PN=0(t0) |
|---|
| PN=4(t1) |
| PN=8(t2) |

Stream 1

| PN=0(t0) |
|---|
| PN=2(t1) |
| PN=4(t2) |

Stream 2

| PN=0(t0) |
|---|
| PN=1(t1) |
| PN=2(t2) |

Stream 3

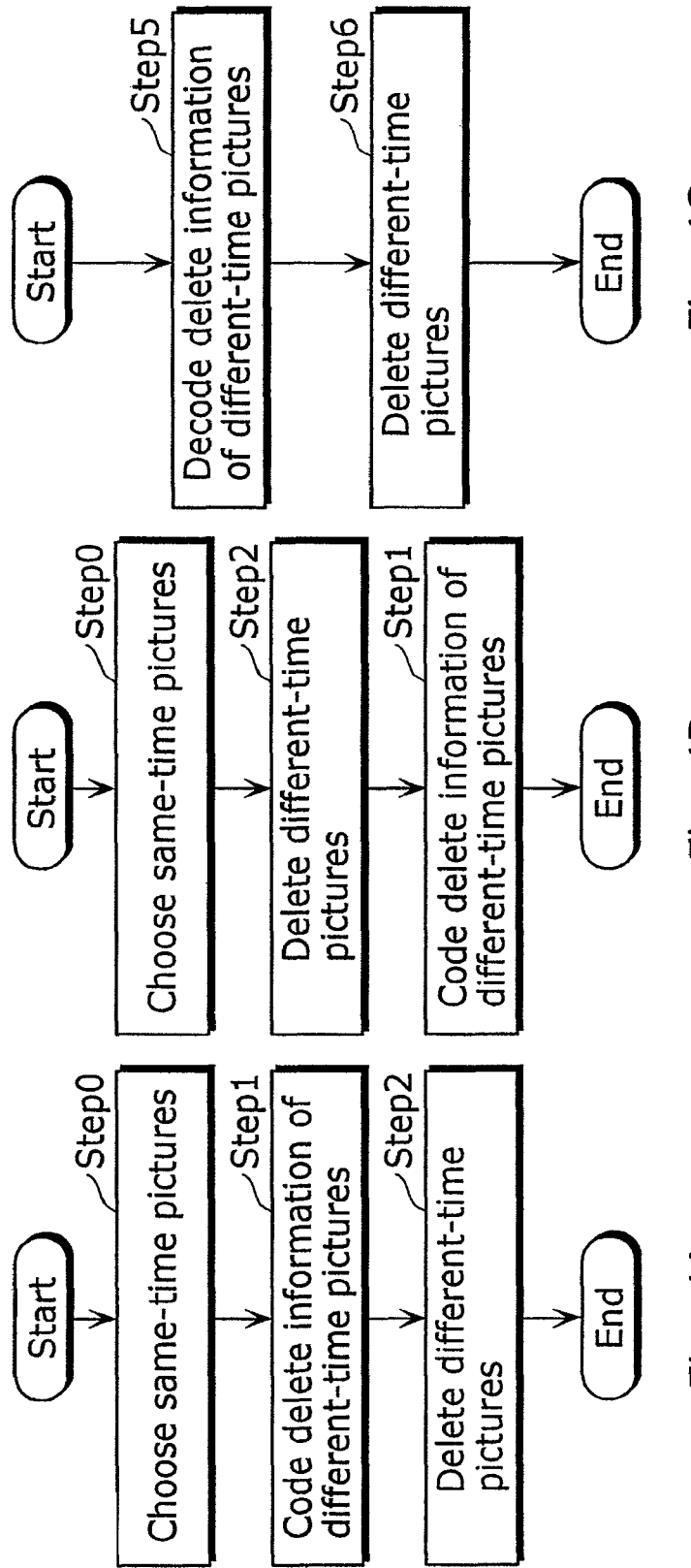

Stream 1: PN=6(t0), PN=7(t1), PN=8(t2)

Stream 2: PN=6(t0), PN=7(t1), PN=8(t2)

Stream 3: PN=6(t0), PN=7(t1), PN=8(t2)

Fig. 5A

Stream 1: PN=9(t0), PN=10(t1), PN=11(t2)

Stream 2: PN=9(t0), PN=10(t1), PN=11(t2)

Stream 3: PN=9(t0), PN=10(t1), PN=11(t2)

Fig. 5B

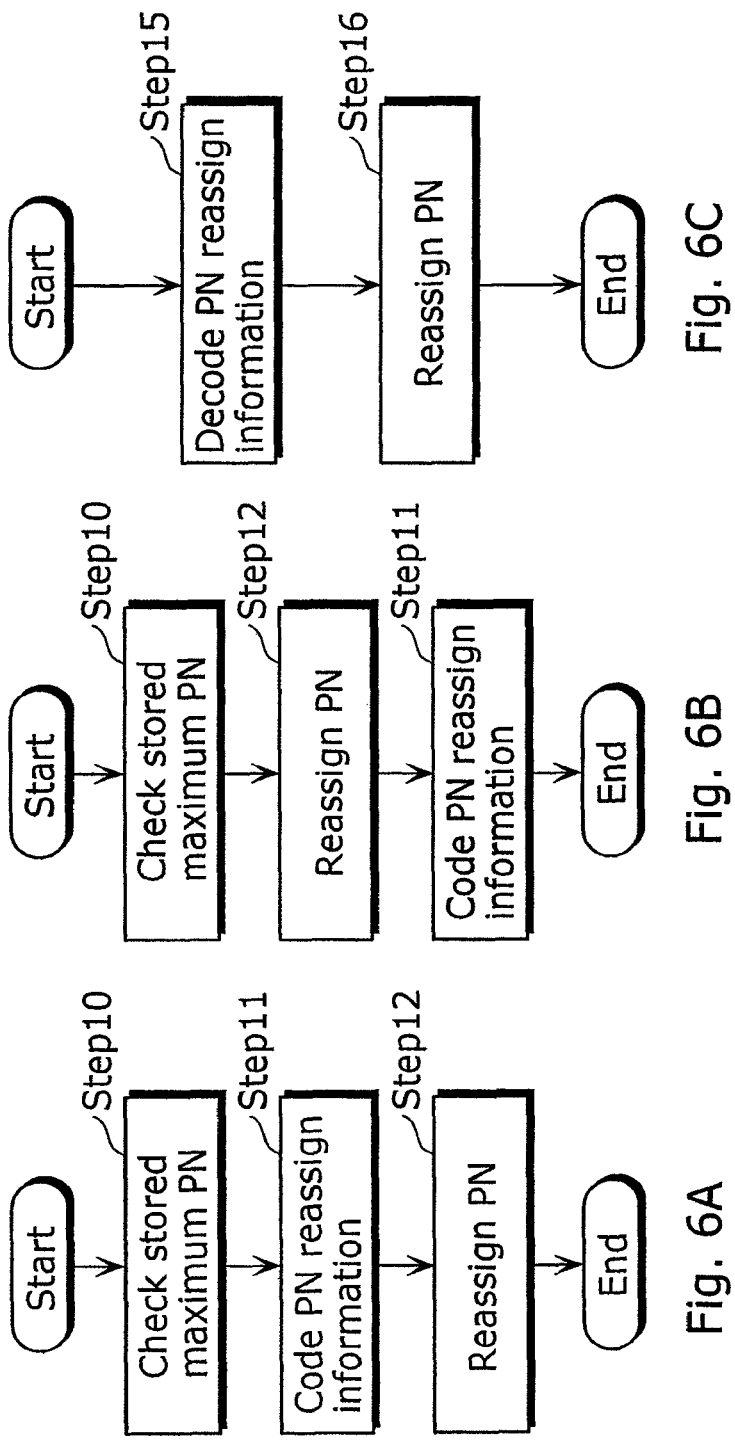

| PN | PN in the memory reassign information | PicType | Picture coding data |

Fig. 10A

| PN | PicType | PN in the memory reassign information | Picture coding data |

Fig. 10B

| PN | All picture delete information | PicType | Picture coding data |

Fig. 10C

| PN | PicType | All picture delete information | Picture coding data |

Fig. 10D

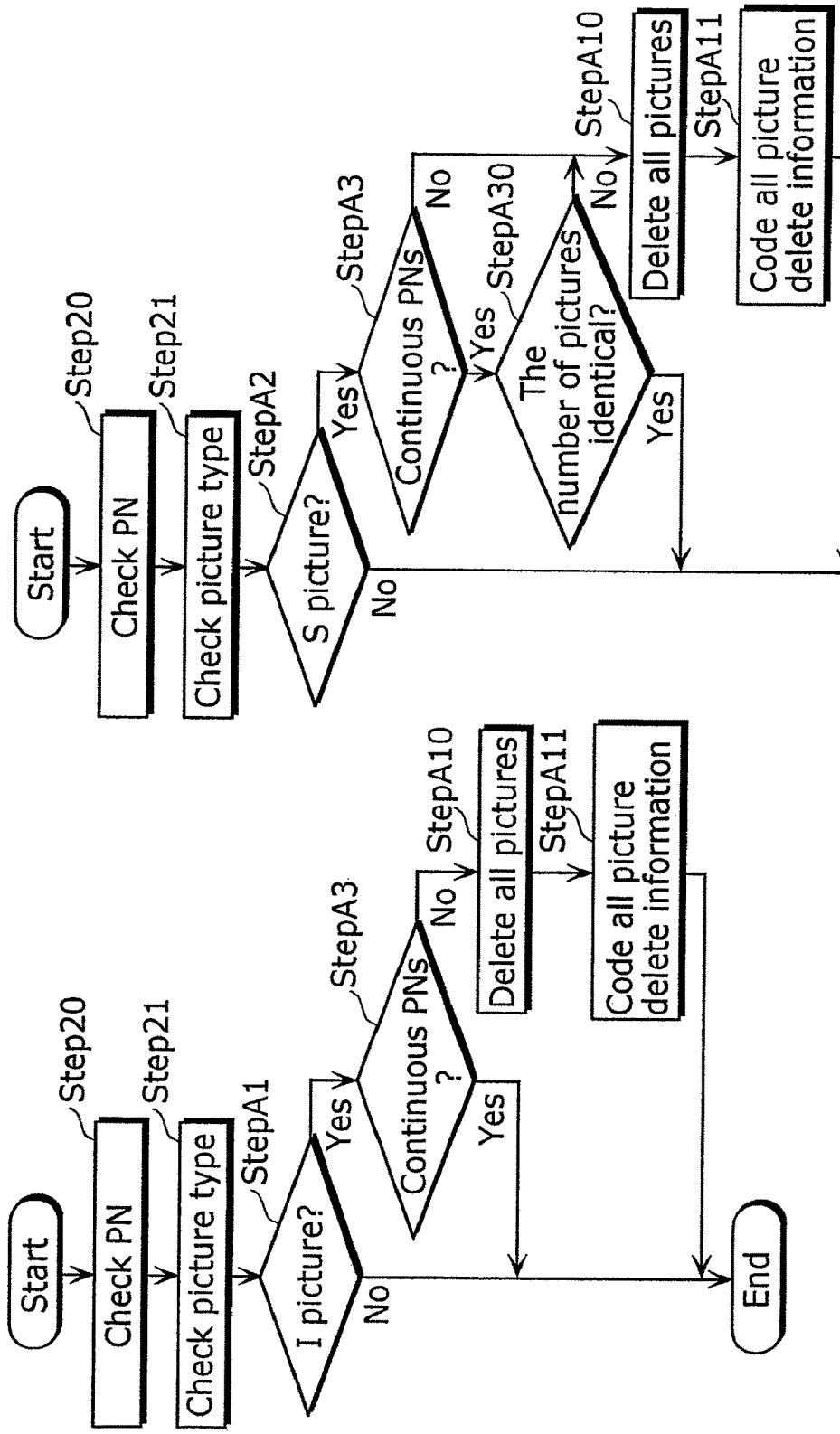

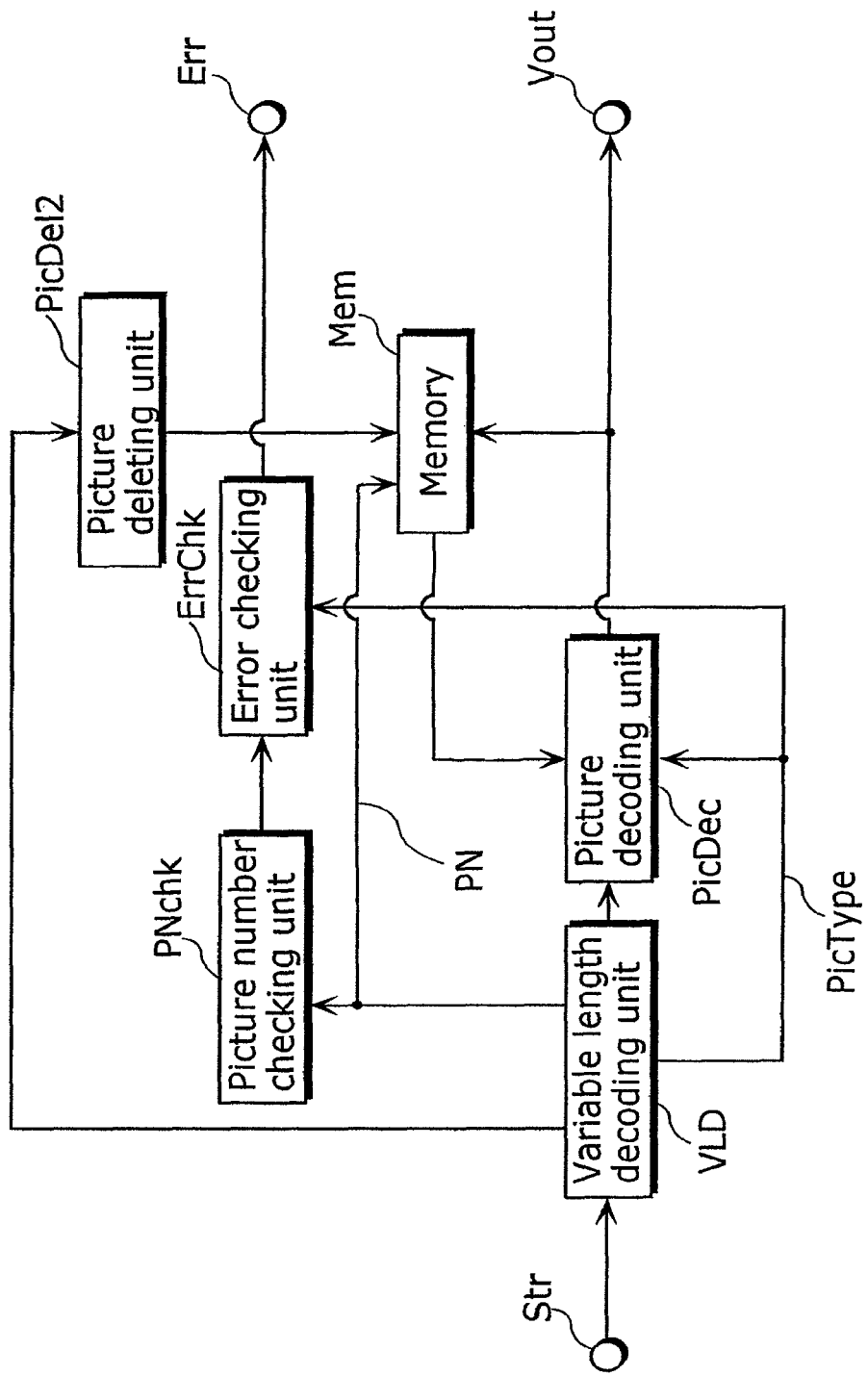

PICTURE CODING METHOD AND PICTURE DECODING METHOD

TECHNICAL FIELD

The present invention relates to a picture coding method for efficiently compressing moving picture signals by using correlation between pictures, a picture decoding method for decoding the signals correctly, and a recording medium on which a program for executing these methods by using software is recorded.

BACKGROUND ART

The multimedia era has arrived recently in which sound, pictures and other pixel values are integrated into one media, and conventional information media as communication tools like newspapers, magazines, TV, radio and telephone are regarded as the targets of multimedia. Generally, multimedia is a form of the simultaneous representation of not only characters but also graphics, sound, and especially pictures. In order to handle the above-mentioned conventional information media as multimedia, it is a requisite to represent the information digitally.

However, it is unrealistic to directly process a huge amount of information digitally by using the above-mentioned conventional information media because, when calculating the data amount of each information medium mentioned above as a digital data amount, the data amount per character is 1-2 bytes while that of sound per second is not less than 64 kbits (telephone speech quality) and that of moving pictures per second is not less than 100 Mbits (present TV receiving quality). For example, a TV telephone has already become commercially practical thanks to Integrated Services Digital Network (ISDN) with a transmission speed of 64 kbps-1.5 Mbps, but it is impossible to transmit pictures of a TV camera as they are using ISDN.

That is why an information compression technique is necessary. For example, a moving picture compression technique standard of H.261 or H.263, which is internationally standardized by the International Telecommunication Union-Telecommunication Standardization Sector (ITU-T), is used for TV telephones. Also, it is possible to store picture information with sound information in ordinary music compact discs (CDs) by using the information compression technique of the MPEG-1 standard.

Here, Moving Picture Experts Group (MPEG) is an international standard to digitally compress moving picture signals, and MPEG-1 is the standard to compress moving picture signals to 1.5 Mbps, that is, to compress TV signal information to about one-hundredth of the original size of the information. Also, the quality which satisfies the MPEG-1 standard is a medium level that can be realized at a transmission rate of about 1.5 Mbps. MPEG-2 is thus standardized in order to satisfy the need for higher picture quality, and MPEG-2 compresses moving picture signals to 2-15 Mbps.

Presently, the work group (ISO/IECJTC1/SC29/WG11), which standardized MPEG-1 and MPEG-2, has standardized MPEG-4 with a higher compression rate. MPEG-4 introduced not only efficient coding at a low bit rate, but also a powerful error-resist technique that lessens subjective picture deterioration in case a transmission error occurs. Also, as a picture coding system for the next generations, ISO/IEC and ITU-T are jointly working for the standardization of Joint Video Team (JVT). The standard called Joint Model 2 (JM2) is presently the latest version.

The picture for intra predictive coding without any reference picture is called Intra Coded Picture (I picture). In addition, the picture for inter predictive coding with a reference picture is called Predictive Coded Picture (P picture). Also, the picture for inter predictive coding in which two reference pictures are referred to simultaneously is called Bi-predictive Coded Picture (B picture).

The term "picture," as used herein, is a term representing one picture. In a progressive picture, a picture means a frame, but in an interlace picture, a picture means a frame or a field. An "interlace picture," as used herein, means a frame that is composed of two fields with a slight time lag. In the coding and decoding processes of interlace pictures, it is possible to process a frame as it is, as two fields, or by each block in a frame in a frame-by-frame structure or in a field-by-field structure.

In JVT, it is possible to choose an arbitrary picture as a forward reference picture from a plurality of pictures, unlike conventional moving picture coding. Also, a system to switch coded bit streams at specific pictures, that is, Switching Coded Pictures (S pictures), has been introduced. (There are SI pictures and SP pictures in S pictures, and these are the pictures for intra predictive coding or inter predictive coding, respectively.)

The S picture system is to guarantee that streams after S Pictures can be decoded correctly in the case of switching from stream to stream just before S pictures. Also, it is possible to switch streams at a server such as a moving picture distribution server according to the communication capacity of receiving terminals or the preference of receivers.

In the conventional picture coding method or conventional picture decoding method, S pictures are introduced so that (1) it can choose an arbitrary picture as a forward reference picture from a plurality of pictures, and (2) it can also switch pictures at specific pictures. Regrettably, in spite of the introduction of these two techniques, problems that occur when these two techniques are combined have not yet been adequately resolved. In reality, it is difficult to use both the techniques together because of the problems shown below.

FIG. 1 is an illustration showing the relationship between pictures and picture numbers (PN) when coding an input picture signal (VIN). The same picture signal is coded at different picture rates (the number of pictures per second) to make Streams 1, 2 and 3. Picture numbers (PN) are numbers to identify coded pictures. In JM2, pictures to be referred to as reference pictures in the following coding are assigned numbers which are incremented by 1. To simplify the explanation, the example of FIG. 1 shows only the case where all of the pictures in each stream are referred to as reference pictures in the following coding, and the picture numbers are always incremented by 1. Pictures that are not referred to in the following coding are unrelated to the increase or decrease in the picture numbers, and are not stored in a memory. Therefore, an explanation as to the pictures that are not referred to in the following coding is omitted because the pictures are unrelated to the following explanation of operations.

As shown in FIG. 1, at the time of t3, the diagonally shaded pictures are coded as S pictures. FIG. 2 is a diagram showing picture numbers (PN) of the pictures to be stored in the reference picture memory when coding or decoding S pictures.

FIG. 2 shows pictures which are stored in the reference picture memory (Mem) and their respective positions. In the reference picture memory (Mem), pictures in the left position are newer in time than pictures in the right position. At the time of predictive coding, the same pictures must be referred to in coding and decoding. When it is possible to choose each reference picture from a plurality of reference pictures like in the JM2, it is necessary to specify which pictures are referred to.

As described below, there are two methods to show reference pictures, and JM2 uses these two methods properly according to the intended purposes. ① Clearly expressing how many pictures there are prior to a newer picture; and ② Clearly expressing a reference picture by a picture number (PN).

In order to correctly code S pictures and the following pictures and to decode these pictures correctly at the time of decoding when switching streams at S pictures, the contents of the reference picture memory (Mem) must be the same in every case of switching streams at S pictures.

However, as shown in the illustration of FIG. 2, which shows the picture numbers (PN) of pictures to be stored in the reference picture memory (Mem), the contents of the reference picture memory (Mem) are not the same at the start of coding or decoding an S picture in each stream. Unless such a conventional method is improved, it is impossible to use the coding method to choose reference pictures from the reference picture memory (Mem) in combination with the S picture system for switching streams.

The present invention aims at solving all of the above-mentioned problems. In particular, the present invention aims to make the S picture system usable in combination with the other coding method to choose reference pictures in a reference picture memory (Mem), thereby providing picture coding and decoding methods that improve compression rates in the above-mentioned combined coding method using S pictures.

SUMMARY OF THE INVENTION

The present invention provides the following inventions in order to resolve the above-mentioned problems with the conventional art.

The first invention is a picture coding method for specifying a reference picture that is stored in a memory by using a picture number for reference and generating a coded stream of moving pictures. The picture coding method comprises a picture number coding step of coding picture numbers corresponding to the current pictures, a coding step of coding the current pictures, a step of making all of the pictures stored in the memory except for the current pictures released for reference after the picture coding step, a picture number initializing step of initializing the picture numbers of the current pictures in the memory, and an all picture release information coding step of coding all picture release information so as to instruct a picture decoding apparatus to release all of the pictures that have already been stored in the memory except for the current pictures.

The second invention is a picture decoding method for specifying a reference picture that is stored in a memory by using a picture number for reference and decoding the coded stream of moving pictures. The picture decoding method comprises an all picture release information decoding step of checking and decoding an all picture release information, which means releasing all of the pictures in a coded stream stored in a memory except for the current pictures to be decoded, a decoding step of decoding the current pictures in the coded stream, a step of releasing all of the pictures that are stored in the memory except for the current pictures according to the decoded all picture release information after the decoding step, and a picture number initializing step of assigning an initialized picture number to the current picture in the memory.

The third invention is a picture coding method for coding a plurality of picture signals and generating coded signals corresponding to the respective pictures, wherein a switching picture which is capable of switching a plurality of coded signals and the following pictures of the switching picture can refer to only a group of pictures of the same time in the coded signals.

The fourth invention is a picture decoding method for decoding a coded signal, wherein information on pictures which is released for reference before a switchable switching picture is decoded, decoded pictures in a reference picture memory are released based on the decoding result, and after the switching picture, a coded signal is decoded by referring to a reference picture that is not released.

The fifth invention is a picture coding method for coding a plurality of picture signals and generating coded signals corresponding to respective pictures, wherein the picture coding method has a step of changing a picture number of a switching picture which is capable of switching a plurality of coded signals into the same value at a respective one of coded signals.

The sixth invention is a picture decoding method for decoding a coded signal comprising a step of changing a picture number of a reference picture into the same value in a switchable coded signal at the time of switching coded signals at a switchable switching picture.

As mentioned above, with the picture coding method and the picture decoding method in the present invention, it is possible to use the feature of S pictures and a coding method for choosing a reference picture in a reference picture memory in combination, which makes it possible to provide a picture coding method and a picture decoding method to improve compression rates even when using S pictures in the coding method, and thus these methods are highly practical.

BRIEF DESCRIPTION OF THE DRAWINGS

FIG. 3 is an illustration of picture numbers (PN) of pictures to be stored in the reference picture memory (Mem).

FIGS. 4A, 4B and 4C are flowcharts of how to code and decode information on controlling pictures to be stored in the reference picture memory (Mem) in the picture coding method and the picture decoding method of the present invention.

FIGS. 5A and 5B are illustrations of picture numbers (PN) of pictures to be stored in the reference picture memory (Mem).

FIGS. 6A, 6B and 6C are flowcharts of how to code and decode information on controlling pictures to be stored in the reference picture memory (Mem) in the picture coding method and the picture decoding method of the present invention.

FIGS. 10A, 10B, 10C and 10D are diagrams showing data structure examples of coded signals Str of the present invention.

FIGS. 17A and 17B are flowcharts showing another coding method in the seventh embodiment.

FIG. 22 is a block diagram showing a structure of a decoding apparatus in an eleventh embodiment of the present invention.

DETAILED DESCRIPTION OF THE INVENTION

The present embodiments of the present invention will be explained below with reference to FIGS. 3-30.

First Embodiment

FIG. 3 is an illustration showing picture numbers (PN) of pictures to be stored in the reference picture memory (Mem).

Figure 2:
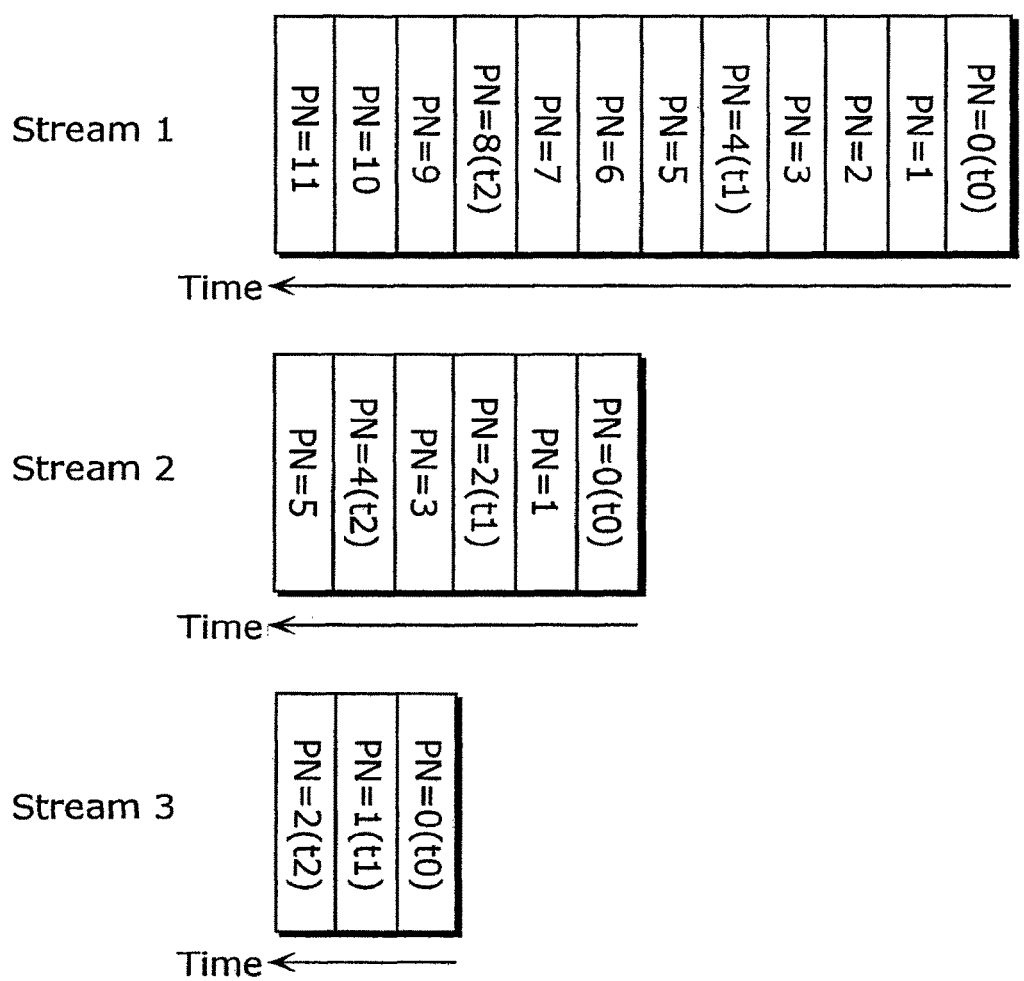
FIG. 2 is a diagram showing picture numbers (PN) of pictures to be stored in a reference picture memory (Mem) when coding and decoding S pictures.

The difference between FIG. 3 and FIG. 2 showing picture numbers (PN) of pictures to be stored in the reference picture memory (Mem) will be explained below.

Figure 1:
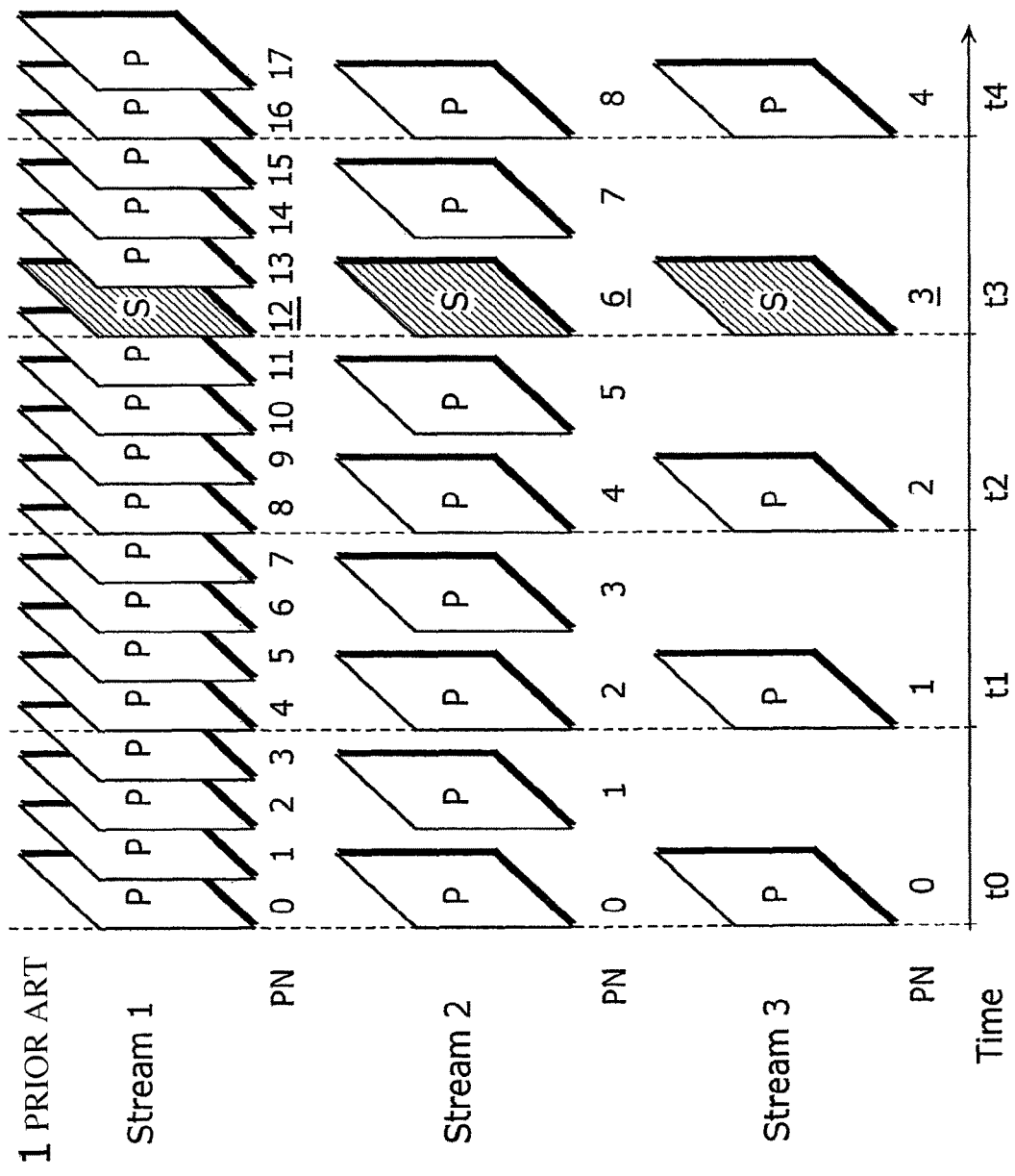
FIG. 1 is an illustration of the relationship between pictures and picture numbers (PN) when coding an input picture signal (Vin).

It has already been explained that, after switching coded signals when coding and decoding S pictures, the content of the reference picture memory (Mem) is not the same. Therefore, in the coding and the decoding methods of the present invention in FIG. 1 showing the relationship of pictures and their picture numbers (PN) when coding an input picture signal (Vin), only pictures at the times of t0, t1 and t2 that are exactly the same respectively in all of the streams are stored in the reference picture memory (Mem), while the other pictures are deleted in the reference picture memory (Mem) before coding and decoding S pictures. FIG. 3 shows the result of this processing as an illustration showing the picture numbers (PN) of the pictures to be stored in the reference picture memory (Mem).

As shown in FIG. 3, explaining picture numbers of pictures to be stored in the reference picture memory (Mem), when the method of "Clearly expressing how many pictures there are prior to a newer picture" is employed to specify reference pictures in coding and decoding, it is possible to code and decode the pictures correctly because exactly the same pictures of the same time are referred to in any case of stream 1, 2 or 3.

FIG. 4 is a flow chart showing coding and decoding methods of information concerning picture control of pictures to be stored in the reference picture memory (Mem) in the picture coding decoding methods of the present invention.

FIG. 4A, as a flowchart of the coding method, shows how to realize the method of the operation explained in FIG. 3, and the coding and decoding methods of the necessary information for realizing the operation.

In Step 0, pictures at the same points of time in a plurality of coding information (streams) are chosen. In Step 1, it is possible to code delete information showing the deletion of the other pictures which are not chosen in Step 0. In Step 2, pictures which are not chosen in Step 0 are deleted from the reference picture memory (Mem). Up to this point, as shown in FIG. 3, it is possible to realize the storage condition in the reference picture memory (Mem) so as to realize decodable streams even after switching coded signals.

Also, it is possible to change the order of Step 1 and 2, and if the order is changed, the flowchart of the picture coding method shown in FIG. 4B is used.

Decoding the delete information which is coded according to the coding method shown in the flowchart of FIG. 4A by using the decoding method shown in the flowchart of FIG. 4C makes it possible to realize the storage condition of the reference picture memory (Mem) to realize decodable streams by using the picture decoding method even after switching coded signals as shown in FIG. 3.

By decoding the delete information in Step 5, it is possible to show pictures that are not the same-time pictures in a plurality of coding information (streams). These pictures are the rest of the pictures that are chosen in Step 0 of FIG. 4A as pictures of the same time. Next, in Step 6, pictures that are chosen in Step 5 are deleted in the reference picture memory (Mem). Specifically, when pictures that are stored in the reference picture memory (Mem) are deleted (or erased), pictures to be deleted are assigned IDs (identification information) such as "release" which prohibits such pictures from being used as reference pictures. For that purpose, a picture decoding unit (PicDec) and a picture encoding unit (PicEnc) always check whether or not IDs of "release" are assigned each time these units refer to pictures that are stored in the reference picture memory (Mem). Only pictures that are not assigned IDs of "release" are referred to by these units, while pictures that are assigned IDs of "release" are not referred to by these units. Likewise, pictures in the reference picture memory (Mem) are deleted (or erased) in the following embodiments. Of course, as this deletion method is an example, it goes without saying that it is possible to delete the above-mentioned picture data in the reference picture memory (Mem) by actually deleting or erasing these data. Up to this point, it is possible to realize the storage condition in the reference picture memory (Mem) so as to realize decodable streams even after switching the coded signals as shown in FIG. 3.

Second Embodiment

FIG. 5A is an illustration showing picture numbers (PN) of pictures to be stored in the reference picture memory (Mem). The difference between FIG. 5A and FIG. 3 showing picture numbers (PN) of pictures to be stored in the reference picture memory (Mem) is whether or not picture numbers (PN) in the reference picture memory (Mem) are the same.

Since not only the times of pictures that are stored in the reference picture memory (Mem), but also the picture numbers (PN) in each stream in the reference picture memory (Mem) are the same in the time frame, it is possible to use the method of "Clearly expressing reference pictures by picture numbers (PN)" when specifying reference pictures in coding and decoding. Thus, it becomes possible to code and decode the pictures correctly because exactly the same pictures of the same time are referred to in any case of stream 1, 2 or 3.

It is possible to realize this by replacing the picture numbers of pictures that are stored in the reference picture memory (Mem) with a new same picture number, and by coding and decoding the information for replacing the old picture numbers with the new one before coding and decoding S pictures.

In addition, there is a need to match picture numbers (PN) of S pictures in any of the streams because the same picture numbers (PN) must be used when storing S pictures the next time.

FIG. 6 is a flowchart showing coding and decoding methods of information for controlling pictures to be stored in the reference picture memory (Mem) according to the picture coding and decoding methods of the present invention, and FIG. 6 shows the realization methods of the operation explained in FIG. 5A and the coding and decoding methods of information that is necessary for the realization.

In Step 10, the maximum value of picture numbers (PN) ("8" in the example of FIG. 5A.) of pictures in the coded signals to be switched in the reference memory (Mem) are detected. In Step 12, information for reassigning picture numbers (PN) of each picture that is stored in the reference picture memory (Mem) is coded with reference to the maximum value of picture numbers (PN). Also, as the need arises, picture numbers (PN) to be assigned to the next S pictures are coded. As stream 3 in FIG. 5A is the same as stream 3 in FIG. 3, there is no need to reassign picture numbers of pictures in stream 3. Therefore, picture numbers are reassigned to necessary pictures only, and thus, only information on necessary reassignment needs to be coded in Step 11. Lastly, picture numbers which are shown by the coded information in Step 11 is reassigned in Step 12. Up to this point, as shown in FIG. 5, the storage condition in the reference memory (Mem) for realizing decodable streams even after switching the coded signals is realized.

Also, as the picture number (PN) of S pictures are 12, in order to make picture numbers (PN) continuous after coding and decoding these S pictures, it is possible to use picture number 11, that is, the picture number (PN) immediately before an S picture (immediately before an S picture of stream 1 in FIG. 1) as shown in FIG. 5B. In this case, picture numbers (PN) always increase in the process of coding and decoding as the picture number (PN) of the S picture is 12, which is more effective because the error check function to regard a decrease in picture numbers (PN) as an error is also realized.

Figure 7:
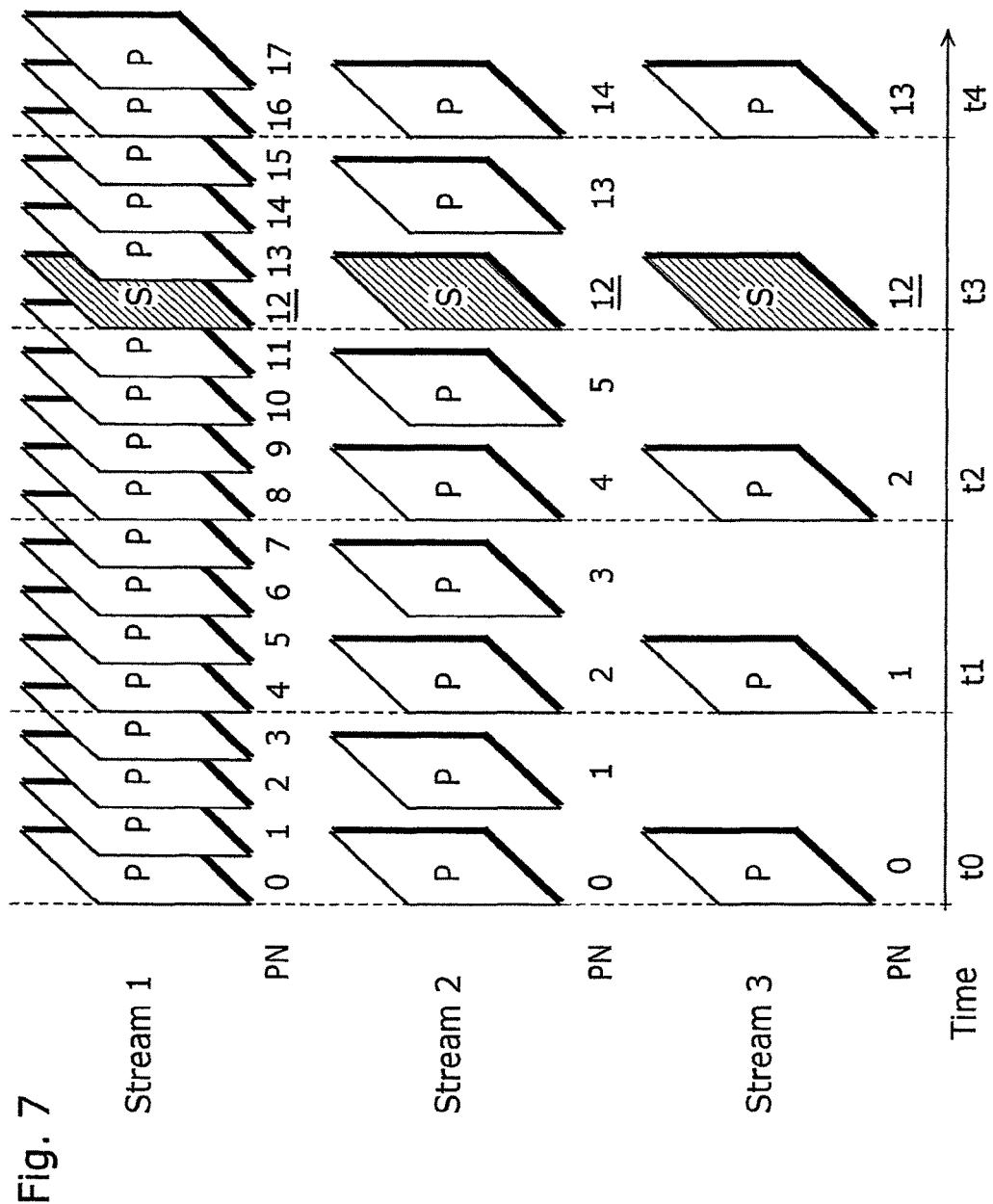
FIG. 7 is an illustration of the relationship between pictures and picture numbers (PN) when coding an input picture signal (Vin) of the present invention.

FIG. 7 is an illustration showing the relationships between pictures and picture numbers (PN) when coding an input picture signal (VIN) of the present invention. FIG. 7 is an example of the reassignment of picture numbers (PN) by using the method explained in FIG. 5B, where all the picture numbers of S pictures are 12. Therefore, it is clear that all the pictures after S pictures are correctly decodable even after switching streams at S pictures because pictures in the reference memory (Mem) are identical irrespective of streams when coding and decoding S pictures. Also, it is possible to change the operational order of Step 11 and 12, and in this case, a flowchart of picture coding method shown in FIG. 6B is used.

Decoding the coded delete information in FIG. 6A shown in the flowchart of the coding method by using the decoding method shown in the flowchart in FIG. 6C of the decoding method makes it possible to realize the storage condition of the reference picture memory (Mem) so as to realize decodable streams using the picture decoding method even after coded signals are switched as shown in FIG. 5A.

Decoding the information on the reassignment of picture numbers (PN) in Step 15 makes it possible to specify the pictures which are necessary for the reassignment of picture numbers (PN) and the method. Next, in Step 16, picture numbers (PN) of pictures in the reference picture memory (Mem) are reassigned based on the pictures which are decoded in Step 15, which thus requires the reassignment of picture numbers (PN) and the reassignment method. Up to this point, it is possible to realize the storage condition in the reference picture memory (Mem) so as to realize decodable streams even after switching the coded signals as shown in FIG. 5.

While this second embodiment explains the effectiveness in combination with the first embodiment, as the second embodiment can solely realize the merit of coding and decoding correctly in the case of "Clearly expressing reference pictures by picture numbers (PN)", it is possible to use only the second embodiment instead of the second embodiment in combination with the first embodiment if the effect of the second embodiment is sufficiently effective.

Third Embodiment

FIG. 8 is another embodiment for realizing an illustration of picture numbers (PN) of pictures to be stored in the reference picture memory (Mem) in FIG. 5.

Picture types are identified by picture type information (PicType). Therefore, when a picture is identified as an S picture that can change streams by the picture type information (PicType), making a rule for reassigning picture numbers (PN) of pictures in the reference picture memory (Mem) to coincide with picture numbers (PN) of S pictures makes it possible to omit coding and decoding the information on reassignment method for each picture number (PN) of pictures in the reference picture memory (Mem).

Figure 8A:
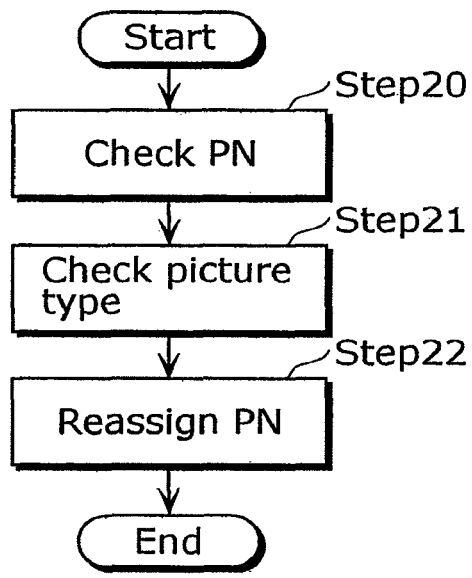
FIGS. 8A and 8B are flowcharts of how to decode information on controlling pictures to be stored in the reference picture memory (Mem) in the picture decoding method of the present invention.

The operation shown in FIG. 8A will be explained below. In Step 20, picture numbers (PN) of pictures are obtained by decoding coded signals. The picture type information (PicType) of the pictures is obtained in Step 21. When the picture type information (PicType) is proved to be S pictures, picture numbers (PN) of pictures in the reference picture memory (Mem), when they coincide with picture numbers (PN) of S pictures, are reassigned based on a specified method in Step 22. Up to this point, as shown in FIG. 5, it is possible to realize the storage condition in the reference picture memory (Mem) so as to realize decodable streams even after switching coded signals.

Figure 8B:
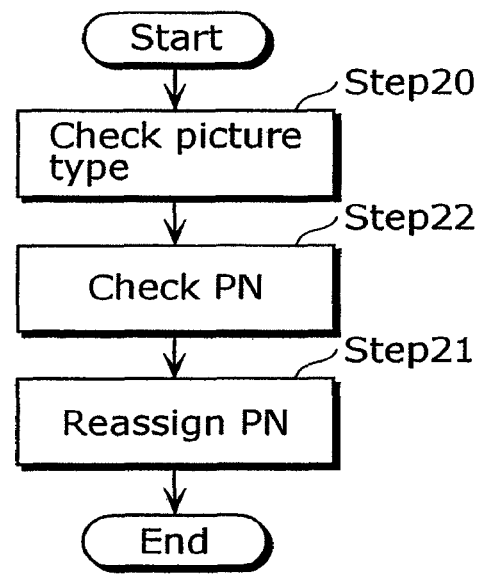

Also, it is possible to change the order of Step 21 and 22, where if the order of Step 21 and 22 is changed, the flowchart of the picture coding method shown in FIG. 8B is used.

Also, it is possible to code and decode only part of reassignment information of picture numbers (PN) (which cannot be represented by the rule for reassigning picture numbers (PN) in the reference picture memory (Mem) when they coincide with picture numbers (PN) of S pictures) in Step 11 and 15 in FIG. 6 by combining the illustration of FIGS. 6 and 8 concerning picture numbers (PN) of pictures to be stored in the reference picture memory (Mem) in FIG. 5.

Fourth Embodiment

Figure 9:
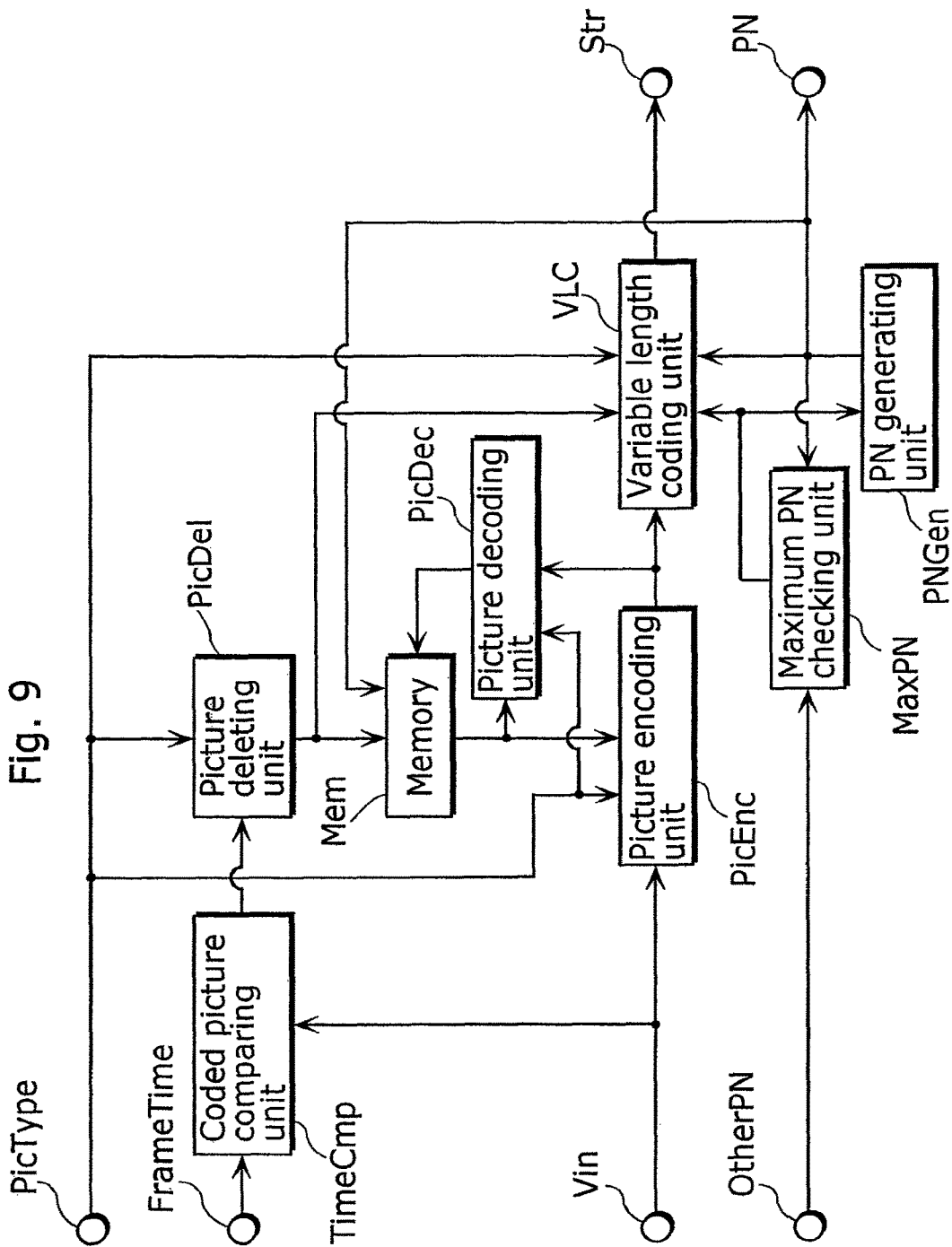
FIG. 9 is a block diagram showing the structure of picture coding apparatus of the present invention.

FIG. 9 is a block diagram showing the structure of the picture coding apparatus of the present invention. FIG. 9 is a block diagram concerning the picture coding apparatus of the present invention, and is an example for realizing the picture coding method in the first embodiment and the second embodiment.

A picture number generating unit (PNGen) generates picture numbers (PN). Picture numbers (PN) are IDs to identify the pictures that are stored in the reference picture memory (Mem), and each picture that is stored in the reference picture memory (Mem) is assigned an exclusive picture number (PN). Usually, picture numbers (PN) are incremented by 1 each time a picture is stored in the reference picture memory (Mem). When a picture number (PN) that is received by a picture decoding apparatus is incremented by 2 or more, the picture decoding apparatus can find that a picture to be stored is missing because of a transmission line error, and thus can correct the error and make the error less conspicuous.

A maximum picture number checking unit (MaxPN) compares other coded signal picture numbers (OtherPN) and picture numbers (PN) which are generated in the picture number generating unit (PNGen), detects the maximum value of picture numbers (PN), notifies a variable length coding unit (VLC) and the picture number generating unit (PNGen) of the maximum value of picture numbers (PN), and initializes picture numbers (PN) to be generated in the picture number generating unit (PNGen) by using the maximum value of picture numbers (PN). Other coded signal picture numbers (OtherPN) are picture numbers of pictures in a different stream in parallel with the pictures to be coded. Consequently, after that, the picture number generating unit (PNGen) starts to output picture numbers (PN) which are larger than the maximum value of the picture numbers (PN).

A coded picture time comparing unit (TimeCmp) compares the frame time of each picture in the input picture signal (Vin) that is coded so far and the frame time of each picture that is coded as other coded signals (streams), and notifies a picture deleting unit (PicDel) of picture information concerning the frame time that is coded in all the streams.

When picture type information (PicType) shows that a next picture is an S picture, the picture deleting unit (PicDel) orders a reference picture memory (Mem) to delete the pictures outside the time frame in all the streams that are stored in the reference picture memory (Mem) based on the information which is notified by the coded picture time comparing unit (TimeCmp), and the picture deleting unit (PicDel) notifies the variable length coding unit (VLC) of the same information at the same time.

A picture encoding unit (PicEnc) refers to the pictures in the reference picture memory (Mem), codes the input picture signal (Vin) including frequency conversion and quantization as a picture type that is shown in the picture type information (PicType), and sends the result to picture decoding unit (PicDec) and variable length coding unit (VLC). A picture decoding unit (PicDec) performs an inverse quantization and frequency conversion of the coding result in a picture encoding unit (PicEnc) as picture types that are shown in the picture type information (PicType), and stores the picture types as picture numbers (PN) in the reference picture memory (Mem) so as to refer to the picture types in the following picture coding process.

The variable length coding unit (VLC) makes the coded result in the picture encoding unit (PicEnc) into variable length codes so as to make a bit stream, codes the information which is needed for decoding, that is, the information for deleting pictures that are stored in the reference picture memory (Mem) which is notified by the picture deleting unit (PicDel), the maximum value of the picture numbers (PN) and the picture numbers (PN) mentioned above, so as to output the information as coded signals (Str). The variable length coding unit (VLC) also codes information which is notified by the picture deleting unit (PicDel) and information for reassigning picture numbers (PN) of pictures that are stored in the reference picture memory (Mem) based on the method shown in the second embodiment.

FIG. 10 shows a structural example of coded signals (Str) in the present invention. Each data in FIG. 10A will be explained below.

First, picture numbers (PN) are coded. Next, the maximum picture number (PN) to be reassigned, information for deleting pictures that are stored in the reference picture memory (Mem) and information for reassigning picture numbers that are stored in the reference picture memory (Mem) are coded. Then, picture type information (PicType) and picture coded data which is outputted by the picture encoding unit (PicEnc) are located.

As FIG. 10A is simply an example of data location, it is possible to change the order of data as shown in FIG. 10B so as to perform picture coding.

It is also possible to prepare the picture coding apparatus consisting of the above-mentioned units so as to realize the picture coding method shown in the first and the second embodiments.

Fifth Embodiment

Figure 11:
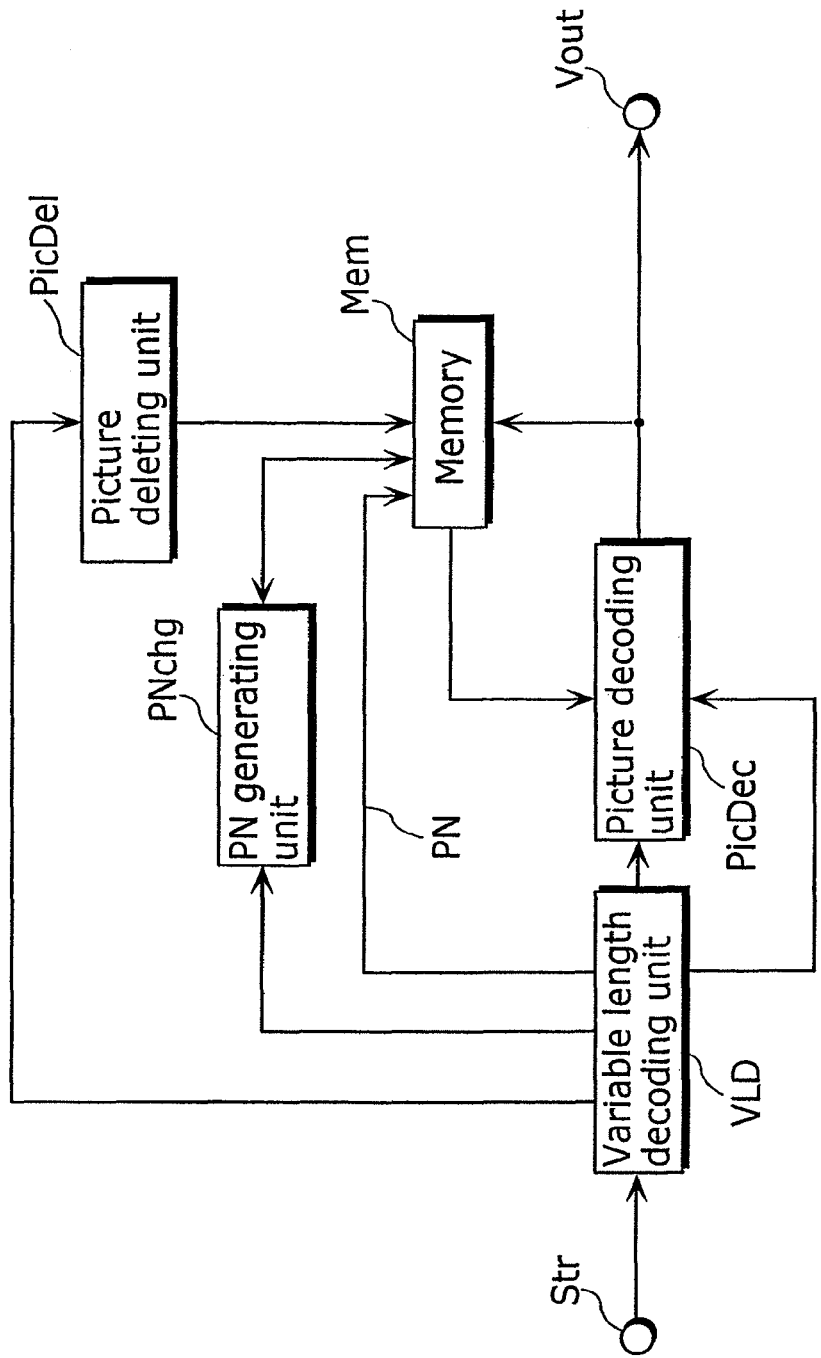
FIG. 11 is a block diagram showing the structure of a picture decoding apparatus of the present invention.

FIG. 11 is a block diagram showing the structure of the picture decoding apparatus of the present invention. FIG. 11 is a block diagram concerning the picture decoding apparatus of the present invention, and is an example of a picture decoding apparatus that realizes the first, the second and the third embodiments. The function of the picture decoding apparatus of the present invention will be explained below.

A variable length decoding unit (VLD) decodes coded signals (Str), and outputs various information (such as an order for deleting pictures that are stored in the reference picture memory (Mem), picture type information (PicType), picture numbers (PN), information for reassigning picture numbers (PN) and picture data.)

The order for deleting pictures that are stored in the reference picture memory (Mem) is obtained in a variable length decoding unit (VLD) and is first sent to a picture deleting unit (PicDel). The picture deleting unit (PicDel) deletes the specified pictures that are stored in the reference picture memory (Mem).

Picture type information (PicType) which is obtained in the variable length decoding unit (VLD) is sent to a picture decoding unit (PicDec) so as to show the decoding method.

Picture numbers (PN) which are obtained in a variable length decoding unit (VLD) are sent to the reference picture memory (Mem) as picture numbers (PN) when storing the pictures that are decoded in a picture decoding unit (PicDec).

Information for reassigning picture numbers (PN) of pictures that are stored in the reference picture memory (Mem) which is obtained in the variable length decoding unit (VLD) is sent to a picture number changing unit (PNchg). The picture number changing unit (PNchg) follows the directions and reassigns picture numbers (PN) of pictures that are stored in the reference picture memory (Mem). To be more specific, the picture number changing unit (PNchg) reads out picture numbers (PN) of pictures that are stored in the reference picture memory (Mem), reassigns the values of the picture numbers (PN) that are read out, and then writes the new picture numbers (PN) in the reference picture memory (Mem).

In the picture decoding unit (PicDec), picture data obtained in the variable length decoding unit (VLD) are decoded in a suitable decoding method for the specified picture type shown as picture type information (PicType). In other words, I pictures are decoded without referring to pictures in the reference picture memory (Mem), while P pictures and B pictures are decoded by referring to pictures in the reference picture memory (Mem). The decoded pictures obtained in this manner are stored in the reference picture memory (Mem) and are outputted as decoded picture signals (Vout).

Up to this point, it is possible to prepare the picture decoding apparatus consisting of the above-mentioned units so as to realize the picture decoding method shown in the first, the second, and the third embodiments.

Sixth Embodiment

In the picture coding apparatus shown in the first to the fifth embodiments, when switching streams at S pictures, the picture numbers of the pictures before the switchable pictures are switched so as to make the picture numbers continuous with the picture numbers of the switchable pictures. In this sixth embodiment, picture numbers are switched at the switchable pictures.

As to coding of a plurality of streams having a different picture rate or a bit rate, or a different structure, here is an example of a stream switching method that enables coding after switching coded pictures from a picture under coding in a stream to a picture in another stream. For convenience of explanation, the simpler phrase of "switching streams" is used below.

In addition, in this sixth embodiment, whether or not pictures to be coded should be stored in the reference memory is judged based on the increment in picture number between pictures to be coded and pictures forwardly adjacent to the pictures to be coded (Simply, "the preceding picture" is used below.) in the coding order. To be specific, when an increment in picture number between a preceding picture and a picture to be coded is 1, the picture to be coded is stored in the reference memory. On the other hand, when the picture number of the pictures to be coded is the same as the picture number of the preceding pictures, the current picture is not stored in the reference memory.

The processing of switching picture numbers (PN) of switchable pictures will be explained concretely with reference to FIG. 12.

Figure 12:
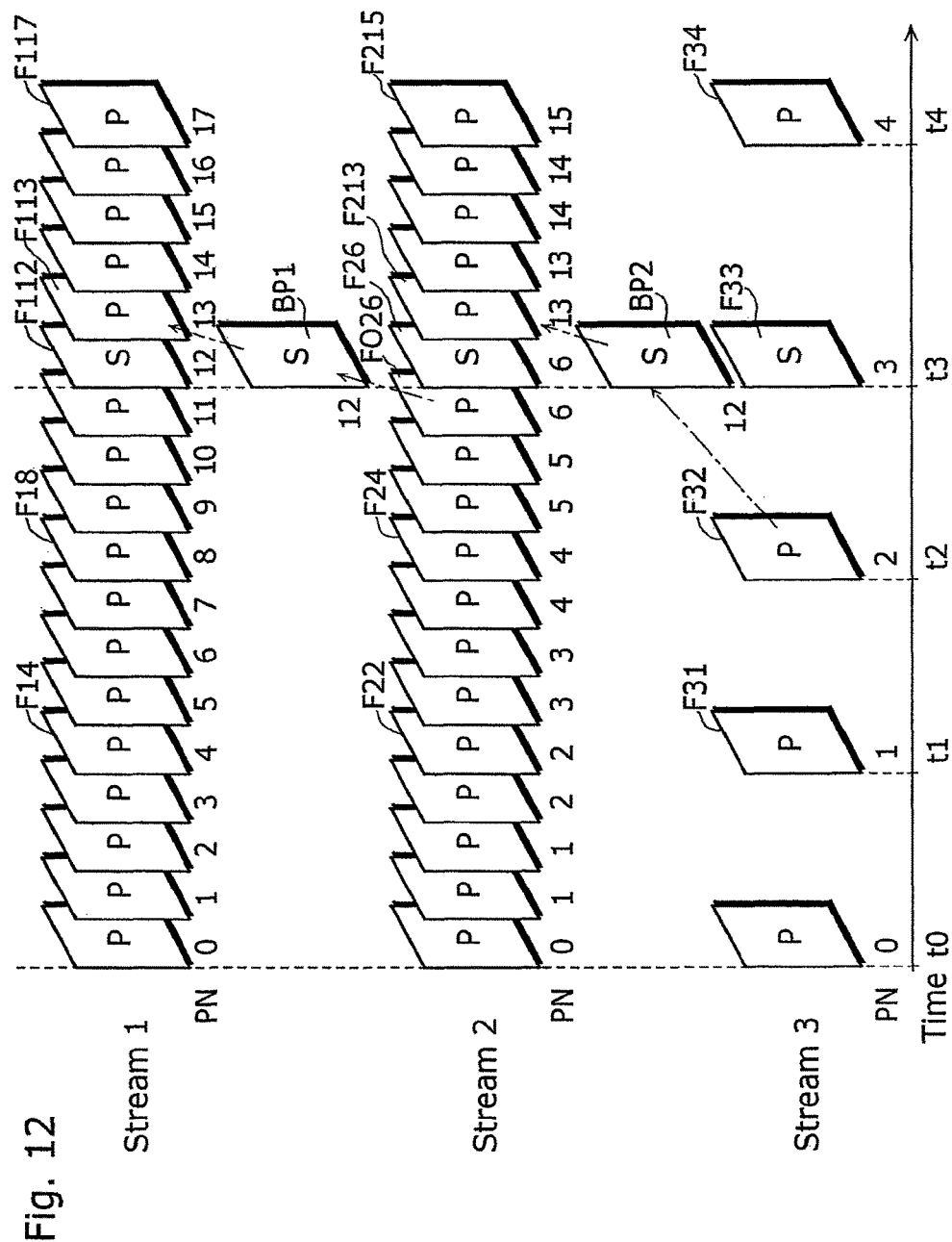
FIG. 12 is an illustration of the relationship between pictures and picture numbers (PN) for coding an input picture signal (Vin) of the present invention.

FIG. 12 is a diagram showing an example of the relationship between pictures and picture numbers (PN) when an input picture number (Vin) is coded. An identical picture signal is coded at different picture rates to make streams of 1, 2 and 3. In FIG. 12, pictures are located according to the cording order in each stream.

In stream 1, a picture number (PN) is assigned to each picture so that the picture numbers are incremented by 1. Also, in stream 2, there are pictures which are assigned picture numbers (PN) that are incremented by 1 and pictures which are assigned the same picture numbers (PN) as the precedent pictures. Also, in stream 3, a picture number (PN) is assigned to each picture so that the picture numbers are incremented by 1 similar to stream 1.

Therefore, as the picture numbers are incremented by 1 in streams 1 and 3, pictures to be coded are stored in the reference memory. In stream 2, pictures which are assigned picture numbers (PN) in a way that the picture numbers are incremented by 1 are stored in the reference memory, and pictures where assigned the same picture numbers (PN) as the precedent picture(s) are not stored in the reference memory.

Also, pictures which are assigned the picture number of "0" in streams 1, 2 and 3 are pictures that are to be displayed at the time of t0. Likewise, the groups of pictures listed below are pictures that are to be displayed at the same time: Picture F14 in stream 1, picture F22 in stream 2 and picture F31 in stream 3 are pictures that are to be displayed at the time of t1; picture F18 in stream 1, picture F24 in stream 2 and picture F32 in stream 3 are pictures that are to be displayed at the time of t2; picture F112 in stream 1, picture F26 in stream 2 and picture F33 in stream 3 are pictures that are to be displayed at the time of t3; and picture F117 in stream 1, picture F215 in stream 2 and picture F34 in stream 3 are pictures that are to be displayed at the time of t4. Note that pictures F112, F26 and F33 correspond to S pictures in the first and second embodiments.

In FIG. 12, streams are switched by way of picture BP1 and BP2 that exist between the picture before switching and the picture after switching, and both of the pictures BP1 and the BP2 are switching pictures which are to be coded in a way so that they have the same time as their precedent pictures in the respective switching streams.

For example, in the case where picture F026 in stream 2 (a picture in the stream before switching) is switched to picture F113 in stream 1 (a picture in the stream after switching), switching picture BP1 that exists between F26 and F113 is used as a picture at the time of t3. In this case, the picture number of switching picture BP1, which is a switching picture, is changed to "12" so as to make the number continuous with the picture number 13 of picture F113 in the stream after switching.

Similarly, likewise, in the case where picture F32 in stream 3 (a picture in the stream before switching) is switched to picture F213 in stream 2 (a picture in the stream after switching), switching picture BP2 that exists between F32 and F213 is used as a picture at the time of t3. In this case, the picture number of switching picture BP2, which is a switching picture, is changed so as to make the number continuous with the picture number 13 of picture F213 in the stream after switching.

In this way, by assigning picture numbers (PN) of switching pictures to make the numbers continuous with the picture numbers (PN) of pictures in the stream after switching, the picture numbers (PN) of pictures in the stream after switching are changed so as to be identical in any case of coded pictures within each stream or switching streams.

Next, the processing of assigning picture numbers (PN) in the case of switching streams will be explained below.

Figure 13:
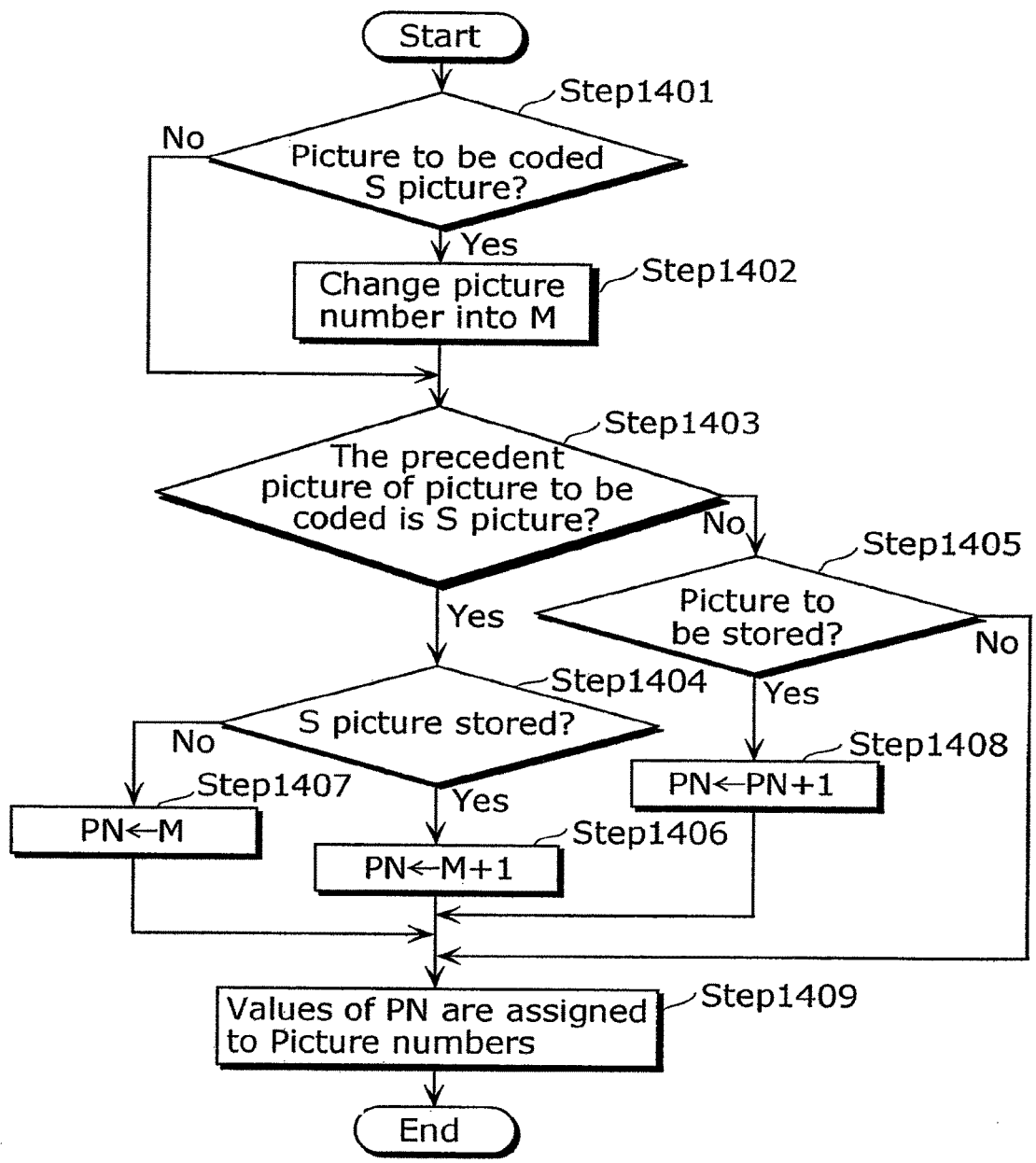
FIG. 13 is a flowchart showing a coding method by giving a picture number to each picture of each stream in the present invention.

FIG. 13 is a flowchart showing a coding method after assigning picture numbers (PN) to respective pictures in the streams in FIG. 12.

In step 1401, it is judged whether or not each of the pictures to be coded is an S picture. When the current pictures are S pictures, the picture numbers (PN) of the current pictures are changed to the initial values of M in step 1402. When the current pictures coded are not S pictures, the picture numbers (PN) of the current pictures are not changed.

In step 1403, it is judged whether or not each of the pictures to be coded is a next picture of an S picture. When the current pictures are the next pictures of S pictures, it is judged in step 1404 whether or not each of the S pictures is stored in the memory. When the current pictures are not the next pictures of S pictures, it is judged in step 1405 whether or not each of the current pictures is stored in the memory.

When S pictures are judged to be stored in the memory in step 1404, the picture number "M" is incremented by 1 to make M+1 in step 1406, and the incremented picture numbers (PN) replace the old picture numbers (PN).

When S pictures are not judged to be stored in the memory in step 1404, the picture numbers (PN) are regarded as "M"s in step 1407. The picture numbers (PN) are not changed. In step 1405, it is judged whether or not the pictures to be coded are stored in the memory. When the current pictures are judged to be stored in the memory, the picture numbers (PN) are incremented to PN+1 in step 1408, and the incremented picture numbers (PN) replace the old picture numbers (PN).

When the pictures to be coded are judged not to be stored in the memory, the picture numbers (PN) are not changed.

In step 1409, target pictures are coded. In step 1410, it is judged whether or not all the current pictures have been coded. When all the current pictures have not been coded, step 1401 must be repeated. When all the current pictures have been coded, step 1401 finishes.

The processing shown in FIG. 13 makes it possible to produce coded data streams whose picture numbers (PN) are continuous in the streams after switching coded pictures.

Also, the coded signals (Str) produced in this way can be decoded based on the decoding method by using the picture decoding apparatus in the fifth embodiment. In this way, the picture decoding apparatus that decodes coded signals in the sixth embodiment is realized.

Also, the coding and the decoding methods shown in the above-mentioned first to sixth embodiments can be implemented in mobile communication instruments such as cellular phones and car navigation systems and in cameras such as digital video cameras or digital steel cameras by using semiconductors such as LSI. Also, there are 3 types of apparatuses which are suitable for the implementation: a sending and receiving type terminal with both of a coding and a decoding apparatuses, a sending terminal with only a coding apparatus, and a receiving terminal with only a decoding apparatus.

Seventh Embodiment

Figure 14:
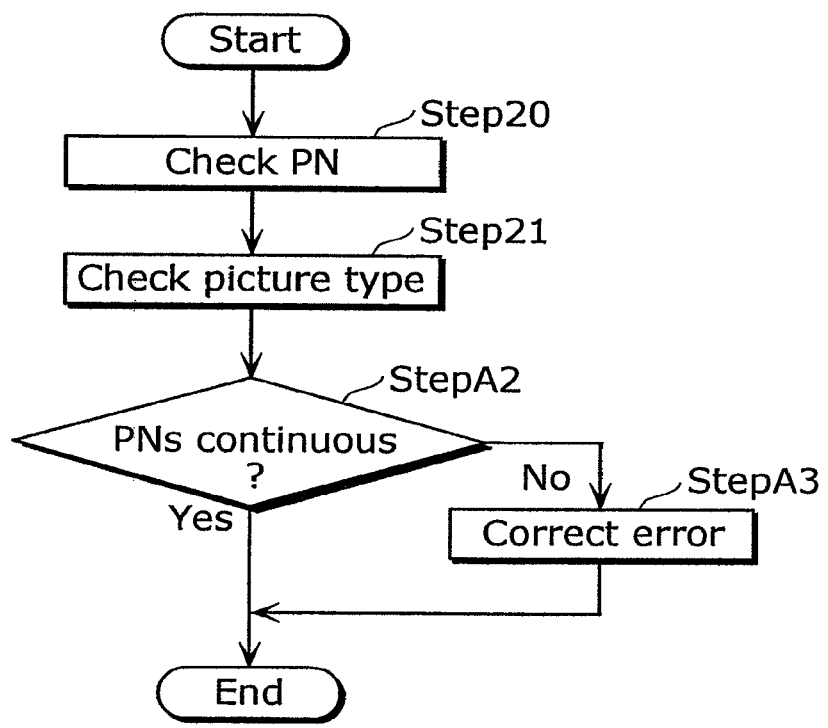
FIG. 14 is a flowchart showing a decoding method in a seventh embodiment of the present invention.
Figure 15:
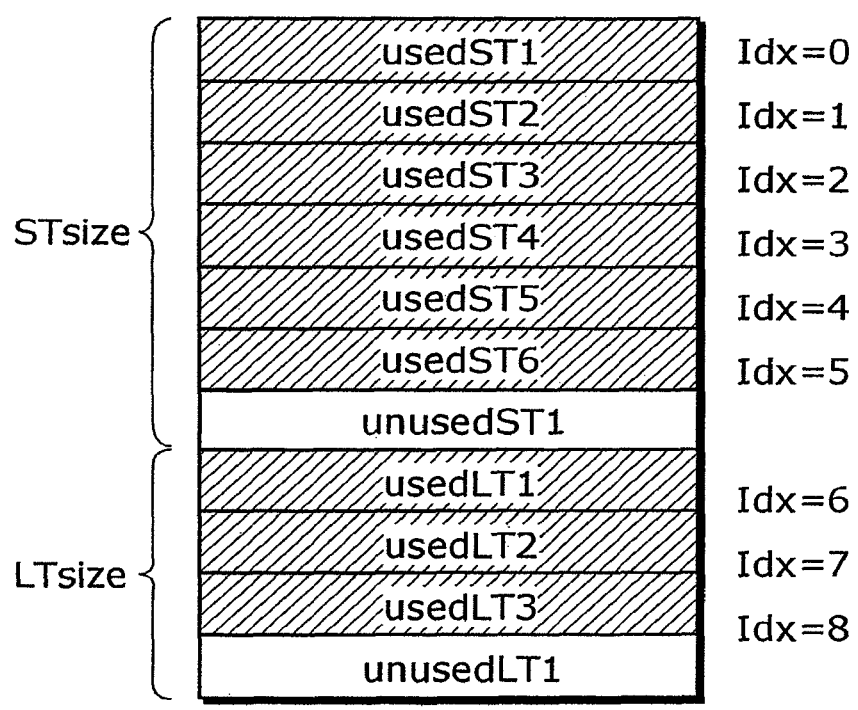
FIG. 15 is a diagram showing a memory structure in the seventh embodiment.

Pictures that should be referred to by the pictures to be decoded are shown in a form of picture numbers (PN). Also, errors of picture numbers (PN) can be detected based on the increase and the decrease in picture numbers (PN). FIG. 14 shows the processing of checking and correcting errors of picture numbers (PN) based on picture numbers (PN).

First, picture numbers (PN) are detected in step 20. Next, picture types (PicType) are detected in step 21. Then, it is judged in step A1 whether or not picture numbers (PN) detected in step 20 are continuous. When the picture numbers (PN) are judged to be continuous in step A2, error checking and correcting processing of picture numbers (PN) is completed. When the picture numbers (PN) are not judged to be continuous in step A2, errors must be corrected in step A3. Note that the processing of checking the stored maximum PN and reassigning "PN"s can be performed either by being solely done after this error checking and correcting processing or by being concurrently done with this error checking and correcting processing.

The first conceivable method of error correcting processing in step A3 is requesting for resending the data concerning the picture numbers with errors and following the error checking processing of picture numbers (PN) again after receiving the resent data. However, the cause of the discontinuity in picture numbers (PN) of S pictures is not a transmission error. That is, as the number of pictures in each stream that is stored in the memory prior to the S pictures may vary in the case where the discontinuity in picture numbers (PN) of S pictures is found, the picture whose picture number (PN) is required to be resent may not exist, and thus it is highly unlikely that a missing picture can be sent. Therefore, the requests for the pictures that cannot be sent are made endlessly, which may be a hindrance in displaying pictures. For this reason, as to countermeasures in the case of problems with displaying pictures, further explanation will be made in a tenth embodiment below.

Also, if the number of pictures in the stream after switching in the memory at the time of switching streams is not the same as that of the pictures in the original stream, displaying the pictures may not be done properly.

First, there are memories of a FIFO memory for short-time storage and a memory for long-time storage that can directly specify storage places without employing "first-in, first-out" so as to store pictures longer than the above-mentioned memory for short-time storage. When the memory for short-time storage can store 7 pictures and the memory for long-time storage can store 4 pictures, one or more reference pictures are specified based on the order calculated from the memory for short-time storage. For example, used LT2 can be specified as the eighth picture (Idx=7) in the memory for long-time storage. In this way, reference pictures are specified based on the relative positions.

When there are 3 streams as shown in FIG. 7, the locations in the memory to specify the identical pictures (such as S pictures shown in FIG. 7) vary from stream to stream as shown in FIG. 2. Further, when referring to pictures in another stream from S pictures, the locations in the memory to specify reference pictures vary according to the memory in each stream. When a plurality of streams exist at the time of switching streams from a predetermined one to another stream, S pictures are those pictures whose precedent pictures in the streams before and after switching are identical.

Not only S pictures but also I pictures can be the pictures at which streams are switched when the pictures that are decoded in a plurality of streams in the reference memory are exactly the same, and thus I pictures can be used for the same purpose as S pictures (for switching streams).

Considering various conditions like this, it is difficult to specify reference pictures correctly if the number of pictures varies from stream to stream, and it is highly likely that there emerges any error even when the reference pictures are specified.

Therefore, this seventh embodiment will show the coding and decoding methods of additional information which is used for avoiding an endless error checking processing of picture numbers (PN) which is triggered by problems like a discontinuity of picture numbers (PN) or an incongruity in the content of the memory. This additional information (all picture delete information) is the order for showing that pictures, except for I pictures and S pictures to be coded, must be deleted from the memory for reference in coding and decoding in order to prevent any error from occurring in the process of coding pictures after coding I pictures capable of intra-picture coding and the above-mentioned S pictures.

This process makes each memory condition identical in a plurality of streams after switching streams from a predetermined stream to another stream and makes it possible to correctly specify predetermined pictures in the memory even when reference pictures are needed for intra-predictive coding and so on. Also, preventing discontinuity in picture numbers (PN) from being detected and corrected as an error resolves the problem of hindering decoding which is caused by requests for resending nonexistent pictures.

The coding method will be explained below in FIG. 16A. FIG. 16A shows the making processing of coded signals in this seventh embodiment.

First, picture numbers (PN) are detected in step 20. Next, picture types (PicType) are detected in step 21. In step A1, it is judged whether or not the detected picture types are I pictures. When the detected picture types are I pictures, all the pictures except for the I pictures to be coded in the memory are deleted in step A10. In the following step A11, all picture delete information, which means deleting all the pictures in the memory, is coded, and this is the last procedure of coding additional information.

Figure 16B:
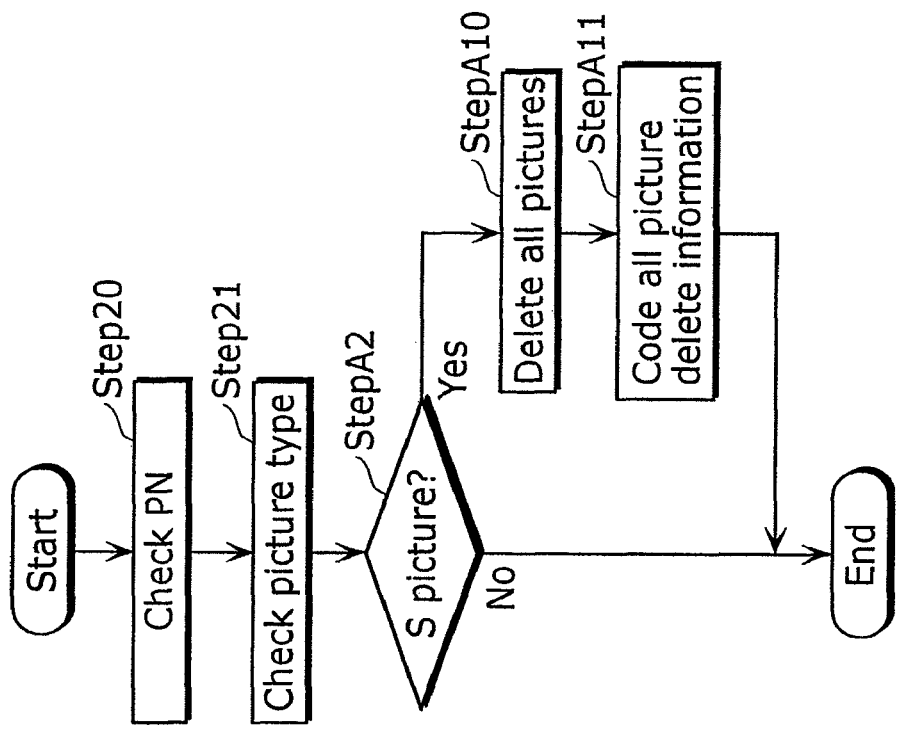
FIGS. 16A and 16B are flowcharts showing a coding method in the seventh embodiment.
Figure 16A:
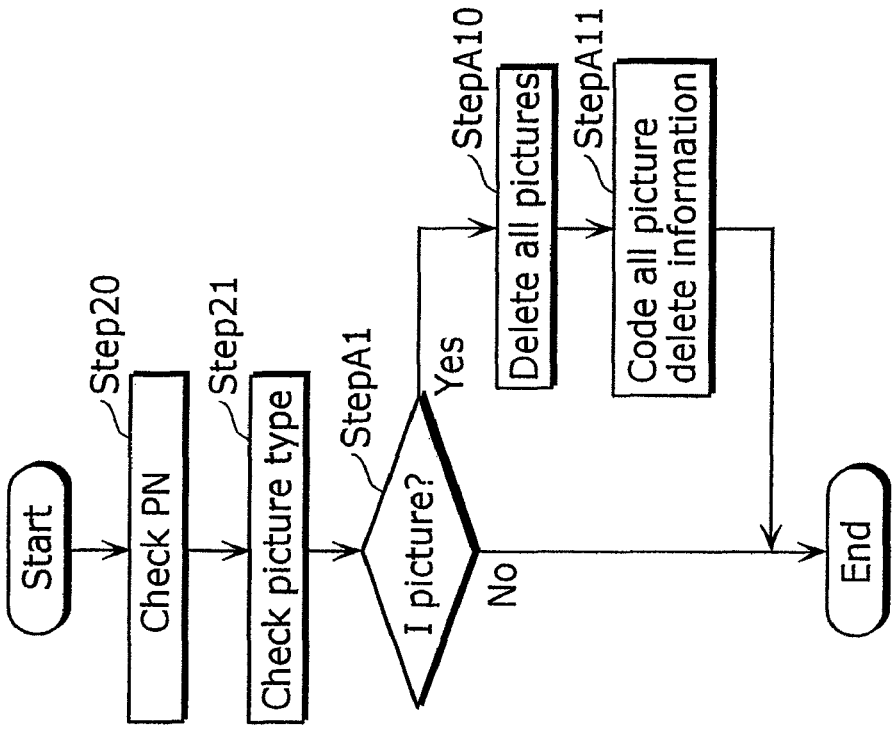

Also, step A1 in FIG. 16A can be used as a step for judging whether or not the picture types are S pictures in the same coding processing as shown in FIG. 16B. Also, it is possible to combine step A1 with step A2 and judge whether the picture types are I pictures or S pictures after checking the picture types in step 21.

As shown in FIG. 17A, when the picture types to be coded are proved to be I pictures in step A1 at the time of checking the picture types in step 21, and when the picture numbers (PN) are judged to be discontinuous after the judgment on whether or not the picture numbers are continuous similar to the judgment made in step A3, it is also possible to delete all the pictures except for the I pictures to be coded in the memory. On the other hand, when picture numbers (PN) are judged to be continuous in step A3, the pictures in the memory are not deleted. When checking S pictures as picture types, the same explanation shown in FIG. 17A holds true. Also, it is possible to combine step A1 with step A2 and judge whether the picture types are I pictures or S pictures after checking the picture types in step 21.

Figure 18:
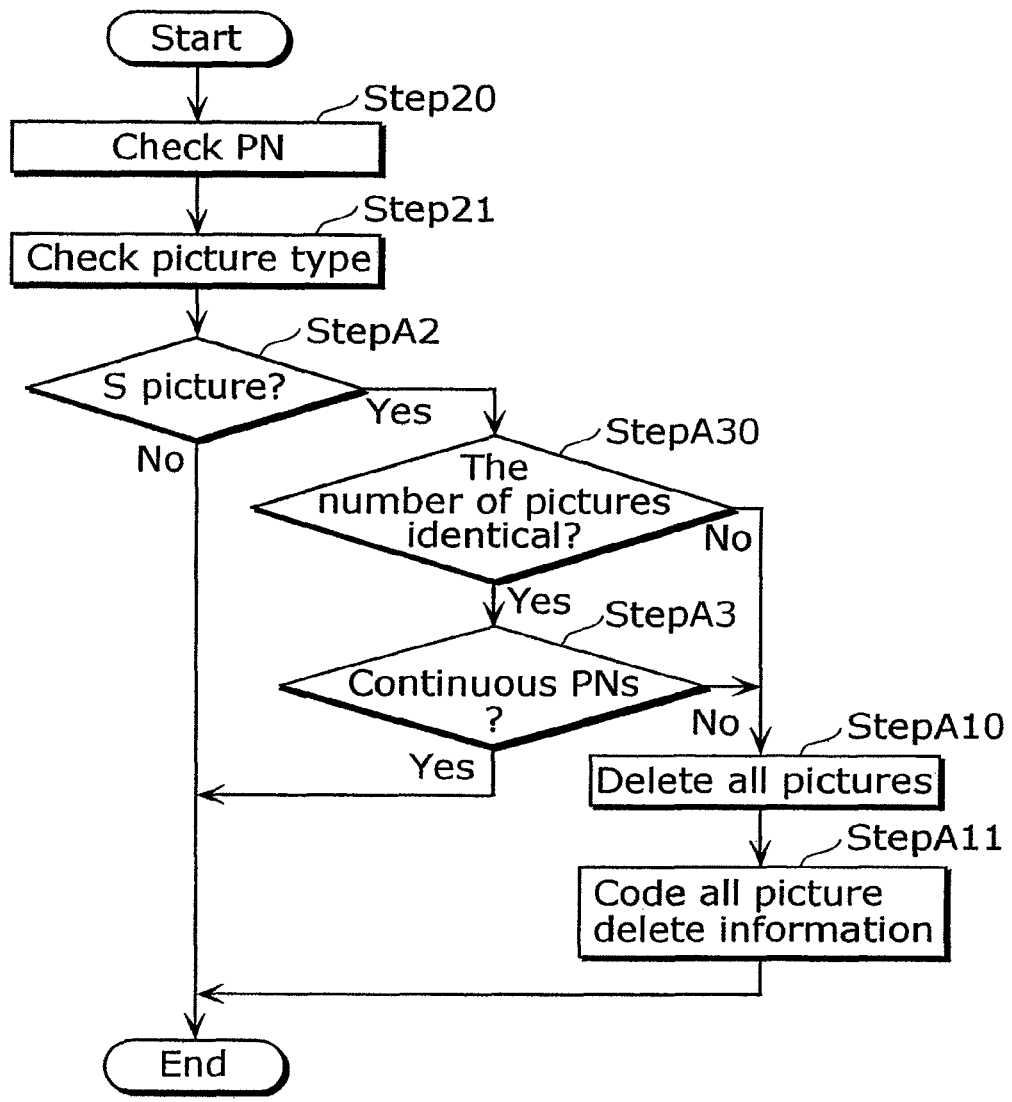
FIG. 18 is a flowchart showing another coding method in the seventh embodiment.

It is also possible to perform the processing of A30, as shown in FIG. 17B, to judge whether or not the numbers of pictures stored in the memory are the same so as to avoid the occurrence of errors caused by the difference in the number of pictures stored in the memory after the processing of step A3 shown in FIG. 17A. It is also possible to perform the processing of step A30 before going on to the processing of step A3 shown in FIG. 17. Further, it is possible to delete all the pictures after performing Step A30 before performing Step A3 in FIG. 17B when the numbers of pictures vary from stream to stream, and it is possible to delete all the pictures shown in step A10 when the numbers of pictures do not vary from stream to stream and the picture numbers (PN) are discontinuous. (FIG. 18)

In this way, the processing of FIG. 17 makes it possible to keep storing as many pictures as possible that may be reference pictures in the memory and to improve the reproducibility of pictures decreasing errors. As to I pictures or S pictures, they need no error correction when the numbers of pictures stored in the memory vary or the picture numbers (PN) are discontinuous, which simplifies memory control in the coding apparatus.

Note that specifying I pictures and ordering deletion of all the pictures in the memory can be shown by picture types that specifies special pictures as I pictures.

Eight Embodiment

Figure 19:
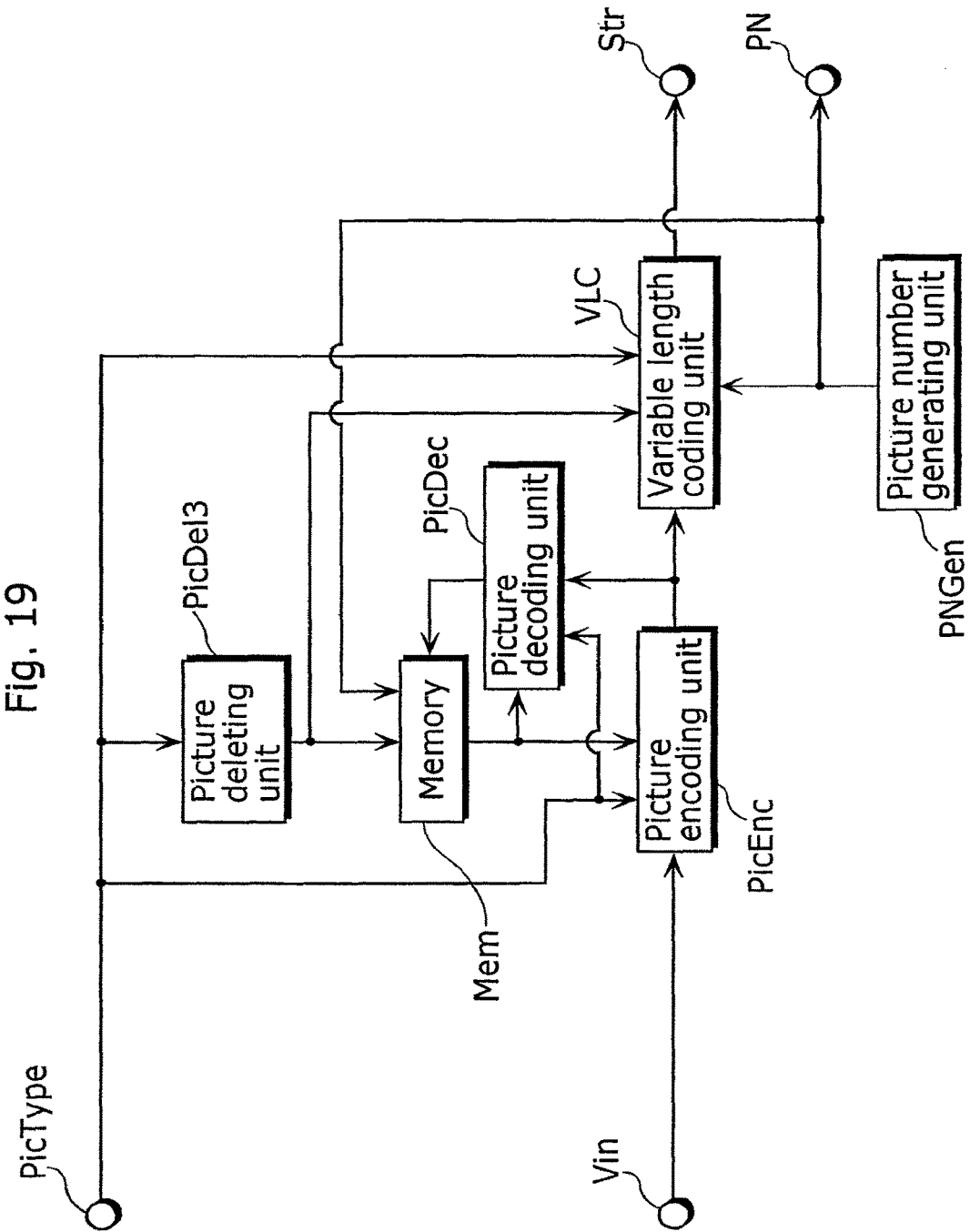
FIG. 19 is a block diagram showing a structure of a coding apparatus in an eighth embodiment of the present invention.

FIG. 19 is a block diagram showing the structure of the picture coding apparatus of the present invention. The block diagram of the picture coding apparatus in the present invention shown in FIG. 19 is an example for realizing the picture coding method in FIG. 16.

A picture number generating unit (PNGen) generates picture numbers (PN). Picture numbers (PN) are IDs that identify pictures that are stored in the reference picture memory (Mem), and each different picture that is stored in the reference picture memory (Mem) is given an exclusive picture number (PN). Usually, picture numbers (PN) are incremented by 1 each time a picture is stored in the reference picture memory. If picture numbers (PN) received in the picture decoding apparatus are incremented by 2 or more, it is possible to detect the lack of pictures to be stored in the transmission line by the picture decoding apparatus and to carry out error correction processing such as picture improvement (making the error less conspicuous) or error correction (retransmitting the picture with no errors to reproduce the picture).

When the picture type information (PicType) shows that the pictures concerned are S pictures (corresponding to the processing of step A2 in FIG. 16), a picture deleting unit (PicDel 3) orders the reference picture memory (Mem) to delete the pictures that are stored in the reference picture memory (Mem) except for the pictures to be coded, and sends the information to a variable length coding unit (VLC) at the same time.

On the other hand, when the picture type information (PicType) shows that the pictures concerned are I pictures (corresponding to the processing of step A1 in FIG. 16), the picture deleting unit (PicDel 3) orders the reference picture memory (Mem) to delete the pictures that are stored in the reference picture memory (Mem) except for the pictures to be coded, and also sends the information to the variable length coding unit (VLC) at the same time.

A picture encoding unit (PicEnc) refers to the pictures that are stored in the reference picture memory (Mem) so as to code the input picture signal (Vin) including frequency conversion and quantization as picture types which are shown by picture type information (PicType), and sends the result to the picture decoding unit (PicDec) or the variable length coding unit (VLC).

A picture decoding unit (PicDec) inversely quantizes and converts the frequency of the information which is coded in the picture encoding unit (PicEnc) as picture types which are shown as picture type information (PicType), and stores the information in the reference picture memory (Mem) as picture numbers (PN) so as to refer the picture numbers in the following picture coding.

The variable length coding unit (VLC) performs variable length coding on the information which is coded in the picture encoding unit (PicEnc) so as to make a bit stream, and codes necessary information for decoding such as the information for deleting pictures that are stored in the reference picture memory (Mem) notified by picture deleting unit (PicDel 3), picture numbers (PN), and picture type information (PicType) to output the information as coded signals (Str).

The structure of the coded signals (Str) in the present invention will be shown in FIGS. 10C and 10D. The data will be explained below.

First, Picture numbers (PN) are coded. Then, in the following order, information for deleting pictures that are stored in the reference picture memory (Mem), picture type information (PicType) and picture coding data outputted by the in picture encoding unit (PicEnc) are located.

As FIG. 10C is merely an example of data location, it is possible to switch data coding orders as shown in FIG. 10D.

The above-mentioned processing enables the picture coding apparatus to realize the picture coding method shown in FIG. 16 and to provide a coding apparatus with high error-resistance.

Ninth Embodiment

Figure 20:
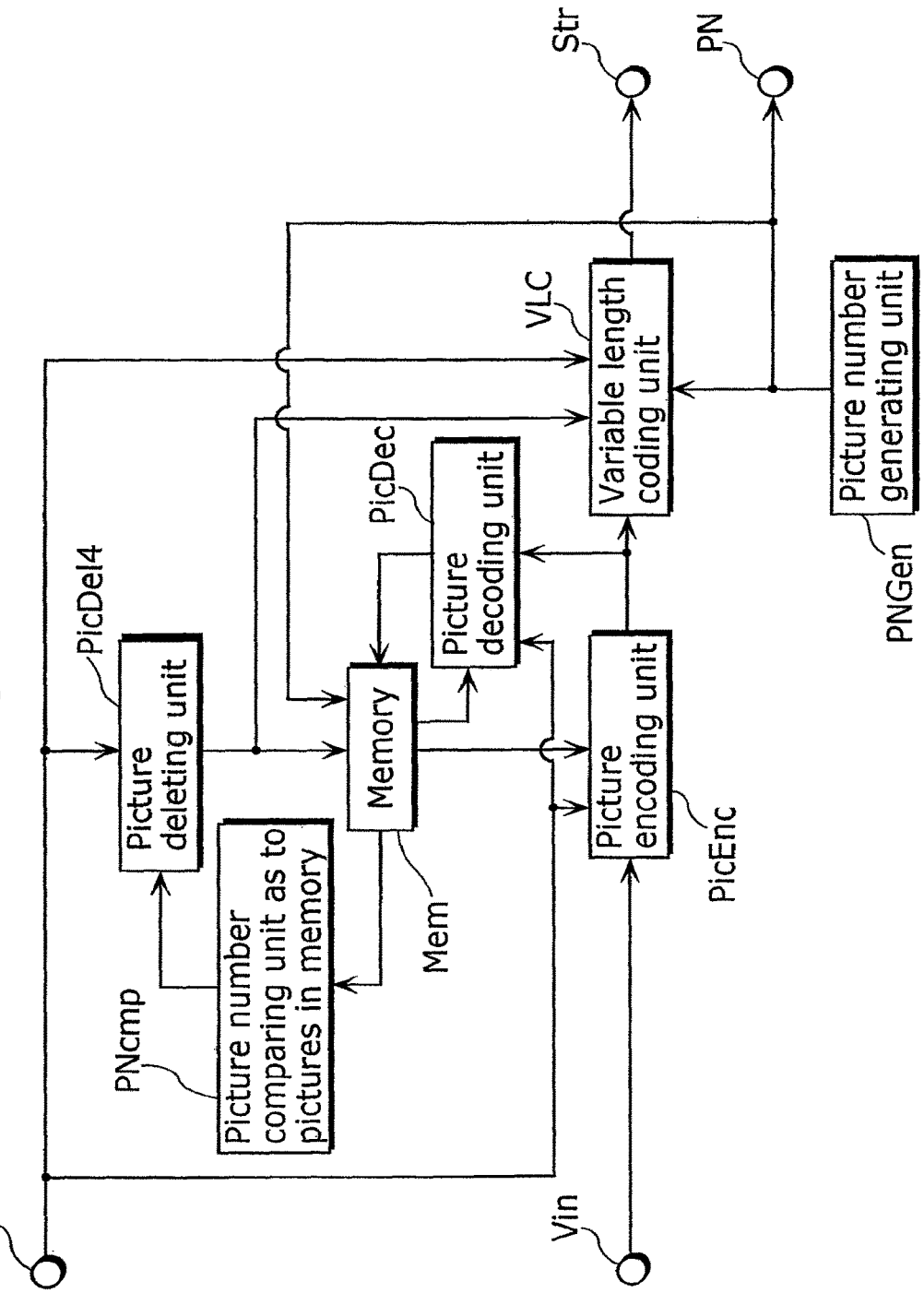
FIG. 20 is a block diagram showing a structure of another coding apparatus in the eighth embodiment.

FIG. 20 is a block diagram showing the structure of the picture coding apparatus of the present invention. The block diagram of the picture coding apparatus of the present invention shown in FIG. 20 is an example for realizing the picture coding method in FIG. 17. An explanation concerning the same units as those explained with reference to FIG. 19 will be omitted from the following explanations.

FIG. 20 and FIG. 19 differ in the process of the picture deleting unit (PicDel 4). To be specific, when the picture type information (PicType) shows that the pictures concerned are S pictures (corresponding to the processing of step A2 in FIG. 17) and the number of pictures varies from stream to stream when comparing the picture numbers, (corresponding to the processing of step A30 in FIG. 17), the picture deleting unit (PicDel 4) orders the reference picture memory (Mem) to delete the pictures that are stored in the reference picture memory (Mem) except for the pictures to be coded, and sends the information to the variable length coding unit (VLC) at the same time. The same is done in the case of I pictures which are shown by the picture type information (PicType). The structure of coded signals of the present invention is the same as the ones shown in FIGS. 10C and 10D.

The above-mentioned processing enables the picture coding apparatus to realize the picture coding method shown in FIG. 17 and to provide the coding apparatus with a high error-resistance.

Tenth Embodiment

The seventh embodiment described above showed that picture display may be hindered because requests for resending pictures that cannot be resent are repeatedly made when a discontinuity of picture numbers occurs at an S picture. The problem-solving method for the example of picture display with problems that are caused by this reason will be explained below.

Figures 21A, 21B:
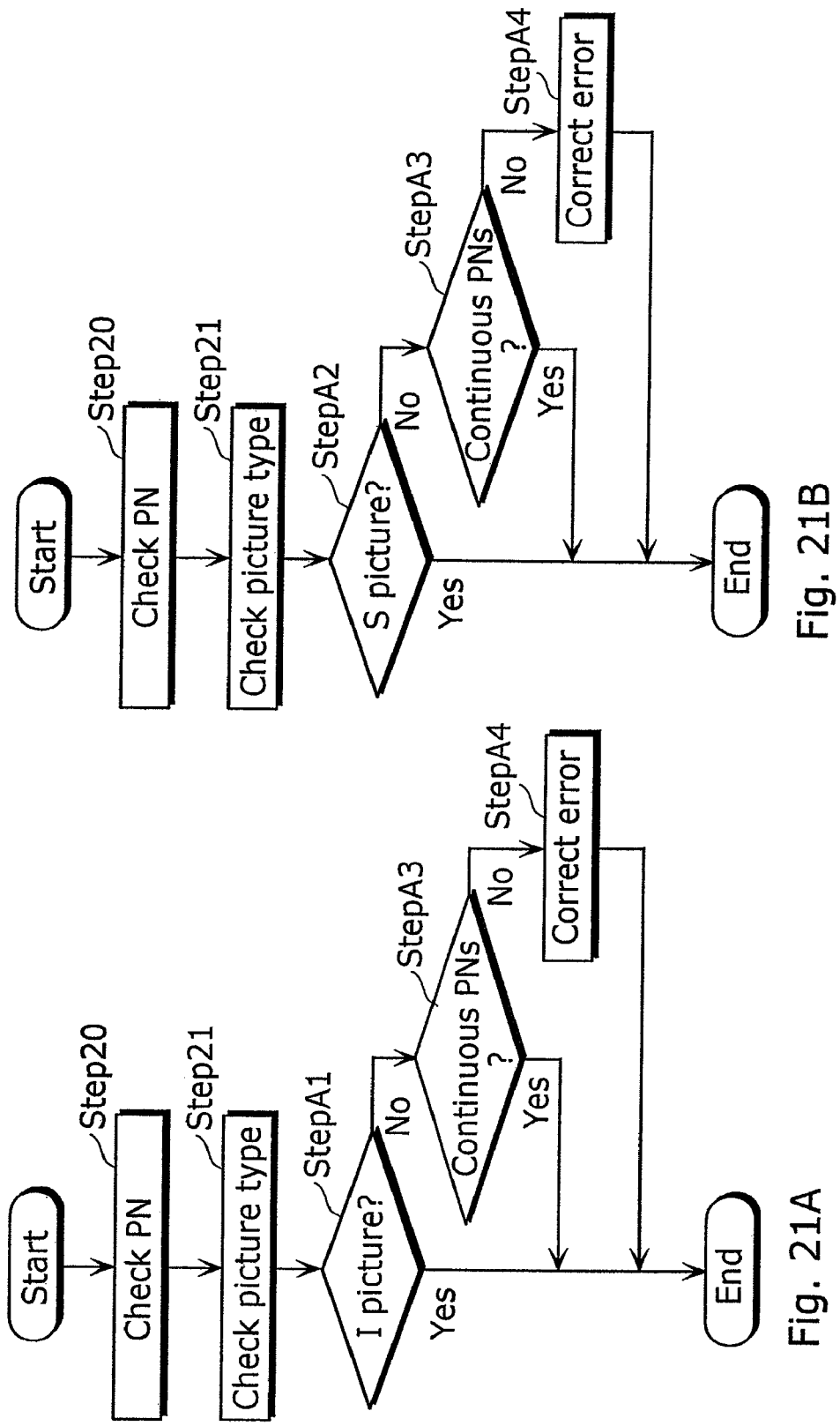
FIGS. 21A and 21B are flowcharts showing a decoding method in a tenth embodiment of the present invention.

FIG. 21A shows the processing of decoding the coded pictures.

First, picture numbers (PN) are detected in step 20. Next, picture types (PicType) are detected in step 21. In step A1, it is judged whether or not the detected picture types are I pictures. When the detected picture types detected are not I pictures, it is judged in step A3 whether the picture numbers (PN) are continuous. On the other hand, when the picture types detected are I pictures, there is no need to detect or correct errors and a series of processing finishes.

When the picture numbers (PN) are not judged to be continuous in step A3, errors are corrected in step A4. On the other hand, when the picture numbers (PN) are judged to be continuous in step A3, the error check and correction processings are completed.

Error correction in step A4 can be, for example, a processing of detecting the stored maximum picture numbers (PN) as explained in the above-mentioned embodiments, or deleting all the pictures that are in the memory after receiving the all picture delete information, which means deleting all the pictures in the memory, in the processing of reassigning picture numbers (PN).

As shown in FIG. 21B, of step A1 in FIG. 21A, the same coding processing can be performed as a step of judging whether the picture types are S pictures or not. Also, it is possible to combine step A1 with step A2 and judge which picture types of I pictures or S pictures they have after checking the picture types in step 21.

In this way, it is possible to avoid hindering decoding as a result of repeating requests for resending the missing pictures so as to correct errors when picture numbers of I pictures or S pictures are not continuous. This processing at an I picture is especially useful in the case of a special I picture capable of switching streams.

Eleventh Embodiment

FIG. 22 is a block diagram showing the structure of the picture decoding apparatus of the present invention. The block diagram of the picture decoding apparatus of the present invention shown in FIG. 22 shows an example for realizing the picture decoding method shown in FIG. 21. An explanation concerning the same units as explained with reference to FIG. 11 will be omitted from the following explanations.

The different point between FIG. 22 and FIG. 11 is the processing in the error checking unit (ErrChk) using picture types (PicType) by the picture number checking unit (PNchk). To be specific, when picture numbers (PN) to be inputted in a picture number checking unit (PNchk) are not continuous and picture types are neither I pictures nor S pictures, an error correction order (Err) is outputted by the error checking unit (ErrChk). With an error correction order, processing such as the stored maximum PN check, PN reassignment or deleting all the pictures in the memory according to the all picture delete information, which means deleting all the pictures in the memory.

The above-mentioned processing enables the picture coding apparatus to realize the picture coding method shown in FIG. 21 and to provide a decoding apparatus with a high error-resistance.

Twelfth Embodiment

The twelfth embodiment explains another countermeasure against an endless error check of picture numbers (PN) which is caused by problems such as a discontinuity of picture numbers (PN) or an incongruity in memory contents. This twelfth embodiment differs from the seventh embodiment in that the picture numbers (PN) are reassigned from "0" when all the pictures are deleted after the same step of deleting all the pictures in the coding shown in the seventh embodiment.

This process makes the respective memory conditions in a plurality of streams identical after switching streams from a predetermined stream to another stream, and initializes the picture numbers (PN). Thus, this process makes it possible to correctly specify the predetermined pictures in the memory even when reference pictures are required in intra-predictive coding and so on. It is also possible to resolve the problem of hindering decoding when switching the coded streams to be decoded from the predetermined stream to another stream by avoiding correcting any picture number discontinuity as errors.

As explained, each picture in the stream is given an exclusive picture number (PN) that is continuous in display time order in the coded streams which are obtained by coding moving pictures. The reason why the picture numbers (PN) are given exclusive picture numbers (PN) that are continuous in display time order is that it makes it possible to check the lack of pictures in the coded streams which is caused by an error in the transmission line in the case where the picture decoding apparatus receives the coded streams by way of the transmission line. When a picture number (PN) of a picture to be inputted in the display time order is incremented by 2 or more while the received coded stream is being decoded, this picture decoding apparatus can check whether a transmission error occurred just before the receiving time of the picture concerned and can request the sender to resend the missing pictures. Therefore, as long as the picture decoding apparatus is decoding one coded stream continuously, the picture decoding apparatus can check transmission errors effectively and receive the resent missing pictures so as to decode the coded streams perfectly.

However, this error check causes a glitch of endless error checking processing, in the case where the picture decoding apparatus is used for continuing decoding after switching to another coded stream with a different picture rate while decoding a coded stream after inputting a plurality of coded streams which are obtained by coding the same moving picture at a different picture rate. The cause of this glitch is that picture numbers (PN) of pictures except for the first picture in each stream vary among coded pictures with different picture rates even in the case of the pictures to be displayed at the same time, in other words, picture numbers (PN) are continuous within each coded stream in the display time order. Therefore, when the decoding target is switched to another stream in the middle of decoding one coded stream in a picture decoding apparatus, picture numbers (PN) are discontinuous even in the case of the pictures to be displayed at the same time. The coding method using additional information (all picture delete information) has been explained in the seventh embodiment so as to avoid the endless error check of picture numbers (PN) caused by the problems such as a discontinuity of picture numbers (PN) or an incongruity of memory contents in this way. This additional information is the order for deleting all the pictures, except for pictures to be coded, from the memory for reference in coding or decoding so that any error should not occur at the time of switching streams in the process of picture coding after coding I pictures for intra-coding or the above-mentioned S pictures.

A coding method of the present invention will be explained below with reference to FIG. 23. FIG. 23A shows the making processing of coded signals in this twelfth embodiment.

First, picture numbers (PN) are detected in step 1. Next, picture numbers (PN) which are detected in step 1 are coded in step 2. Then, picture types (PicType) are detected in step 3. In step 3, it is judged whether or not the detected picture types are S pictures.

When the detected picture types are S pictures, all picture delete information, which means deleting all the pictures in the memory, is coded in step 5. Next, S pictures are coded in step 6A. Then, picture numbers are initialized in step 7, and in the following step 8, all the pictures, except for the S pictures to be coded, in the memory are deleted in step 8. Up to this point, the processing of coding additional information and initializing picture numbers (PN) finishes.

As picture numbers (PN) are continuous unless the detected picture types are S pictures, these pictures are coded in step 6B, but the processing is completed without coding additional information, initializing picture numbers (PN), and deleting all the pictures.

The initialization of picture numbers (PN) in step 7 is performed, for example, by giving a picture number of "0" to the coded S pictures. In other words, initializing picture numbers (PN) of S pictures means giving the pictures after S pictures in the display time order new picture numbers (for example, PN 1) starting from the picture number (PN 0) of S pictures. Consequently, picture numbers (PN) are initialized after coding S pictures (that is, after coding the picture numbers (PN) of S pictures).

The judgment on whether or not the pictures are S pictures is made in step 4, and the judgment on whether or not the pictures are I pictures can also be made. Also, when there is a step of deleting all the pictures in step 23A, picture numbers (PN) should be initialized concurrently because judging whether or not the pictures are I pictures or S pictures is not the sole determinative standard for whether picture numbers (PN) should be initialized. Also, picture number (PN) coding processing in Step 2 can be performed at any time between picture number checking processing in step 1 and the picture number initializing processing in step 7. Also, it is possible to initialize picture numbers (PN) in step 7 after deleting all the pictures, except for the S pictures to be coded, in the memory in step 8. Also, the processing of coding all picture delete information, which means deleting all the pictures in the memory, in step 5 is the processing after the judgment as to whether or not the pictures are S pictures and can be performed at any time before the processing shown in FIG. 23A is finished. Also, it is possible not to code additional information by using special picture types (PicType) that include additional information which indicates that all the pictures except for the pictures to be coded are to be deleted from the memory for reference in coding or decoding. Reassigning picture numbers (PN) so as to switch streams at S pictures or I pictures is effective, but the effectiveness is not limited to the case where streams are switched at S pictures or I pictures, in other words, picture numbers (PN) can be reassigned in the same way on the condition that other pictures such as P pictures are capable of switching streams and that there is a step of deleting all the pictures which are unnecessary for reference.

Figure 24:
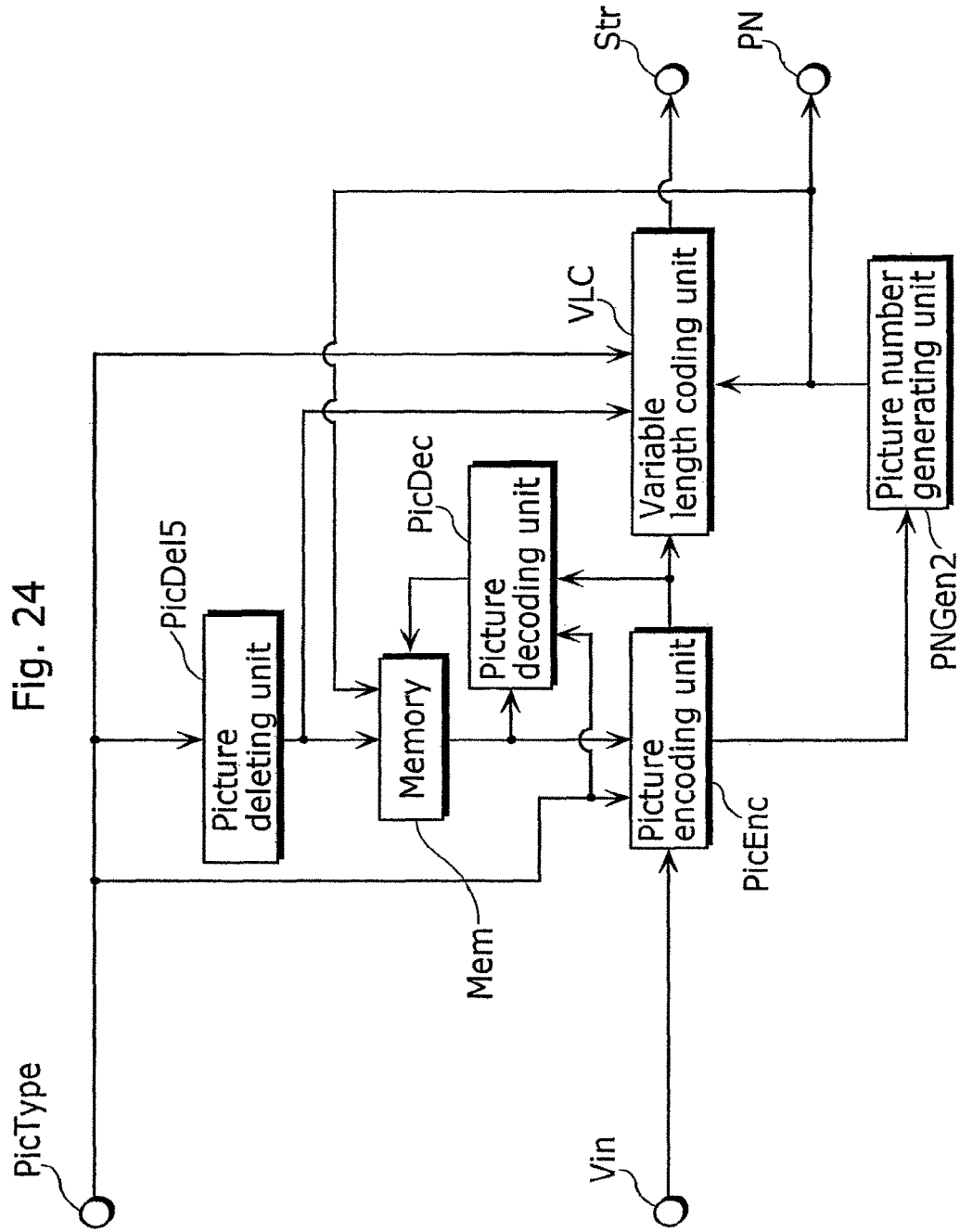
FIG. 24 is a block diagram showing a structure of a picture coding apparatus realizing a coding method in a twelfth embodiment of the present invention.

FIG. 24 is a block diagram showing the structure of the picture coding apparatus which is capable of realizing the coding method in the twelfth embodiment.

A picture number generating unit (PNGen 2) generates Picture numbers (PN). Picture numbers (PN) are IDs that identify the pictures that are stored in the reference picture memory (Mem), where each picture that is stored in the reference picture memory (Mem) is given an exclusive picture number (PN). Basically, picture numbers (PN) are incremented by 1 each time a picture is stored in the reference picture memory (Mem). Also, picture numbers (PN) of the current S pictures are initialized to "0" after S pictures are coded according to the notification from a picture encoding unit (PicEnc).

When picture type information (PicType) shows that the pictures are S pictures (corresponding to the processing of step 3 in FIG. 23), a picture deleting unit (PicDel 5) notifies the reference picture memory (Mem) of an order of deleting the pictures except for the pictures to be coded (all picture delete information) that are stored in the reference picture (Mem) memory, and notifies the variable length coding unit (VLC) of the information at the same time.

The picture encoding unit (PicEnc) refers to the pictures that are stored in the reference picture memory (Mem) so as to code the input picture signal (Vin) into picture types shown by the picture type information (PicType) while concurrently performing frequency conversion and quantization, and sends the result to the picture decoding unit (PicDec) and the variable length coding unit (VLC). Also, the picture encoding unit (PicEnc) notifies the picture number generating unit (PNGen 2) of the order of initializing picture numbers (PN) after coding S pictures.

The picture decoding unit (PicDec) inversely quantizes and inversely converts the information which is coded in the picture encoding unit (PicEnc) into picture types that are shown as picture type information (PicType), and stores the information in the reference picture memory (Mem) by associating the information with picture numbers (PN) so as to refer to the picture types in the following picture coding.

The variable length coding unit (VLC) performs variable length coding on the information which is coded in picture encoding unit (PicEnc) so as to make a bit stream, and codes necessary information in decoding such as the information for deleting pictures that are stored in the reference picture memory (Mem) (that is, all picture delete information) which is notified by picture deleting unit (PicDel 5), picture numbers (PN), and picture type information (PicType) to output the information as coded signals (Str).

Next, a decoding method will be explained below with reference to FIG. 23B. FIG. 23B shows the decoding processing of coded signals.

First, picture numbers (PN) are decoded in step 9. Next, it us judged whether or not all picture delete information is coded in step 10.

When the all picture delete information is judged to be coded in step 10, the all picture delete information is decoded in step 11. Then, pictures are decoded in step 12A. Thereafter, all the pictures except for the pictures to be decoded in the memory are deleted in step 13, and picture numbers (PN) are initialized in step 14. Up to this point, the processing of decoding additional information and the initialization of picture numbers (PN) finishes.

When the all picture delete information is judged not to be coded in step 10, pictures are decoded in step 12B, and the processing of decoding additional information and the initializing of picture numbers (PN) is completed in step 12B.

The initialization of picture numbers (PN) in step 14 is performed, for example, by giving a picture number of "0" to the decoded pictures. In other words, when decoding the coded signals which are coded according to the coding procedure shown in FIG. 23A, initializing picture numbers (PN) of S pictures means giving the pictures after S pictures in the display time order new continuous picture numbers starting from the picture number of the S pictures.

Figures 23A, 23B:
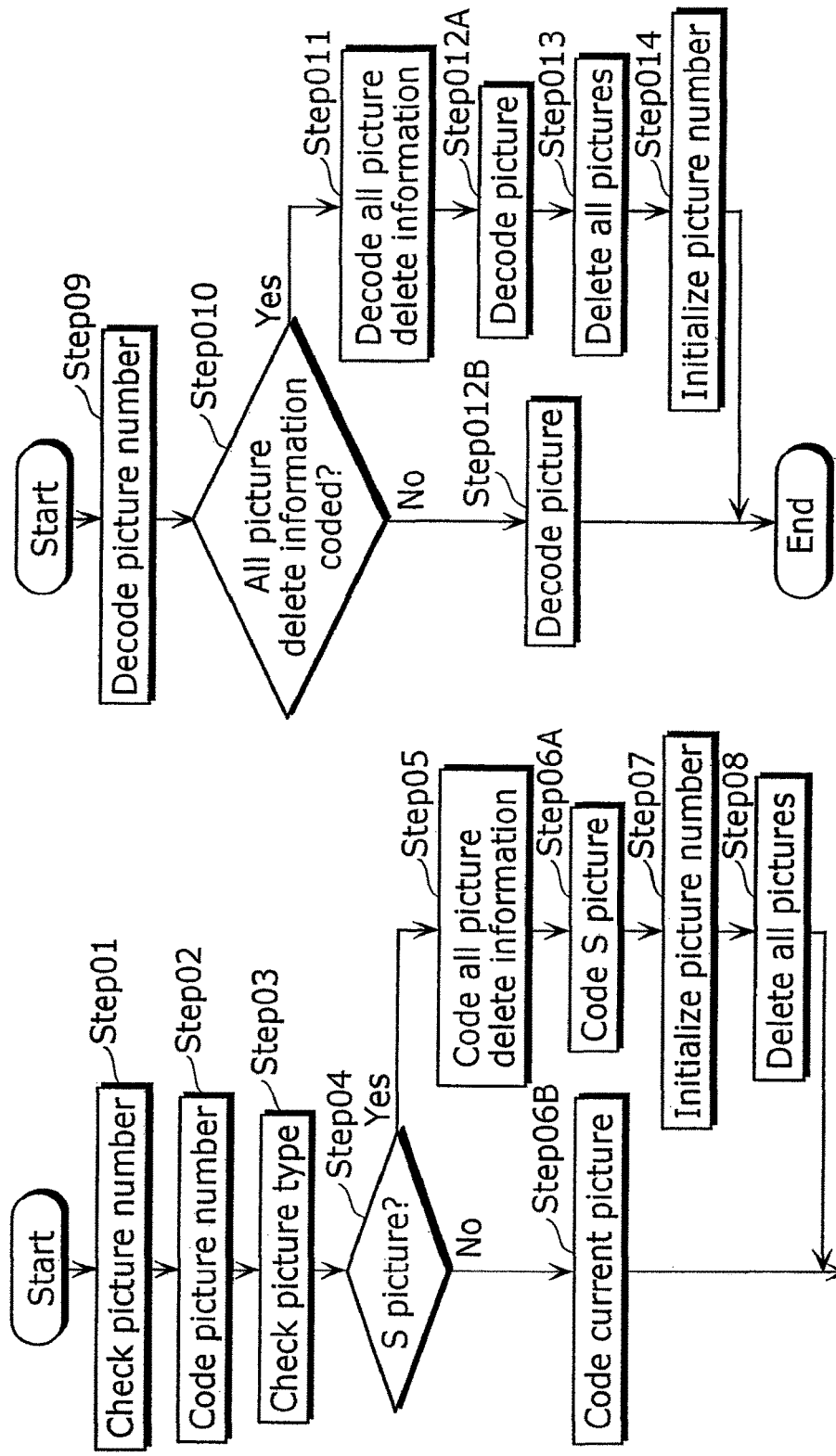
FIGS. 23A and 23B are flowcharts showing the processing for making coded signals and decoding the coded signals.

When there is a step of deleting all the pictures in FIG. 23B, the processing of initializing picture numbers (PN) is necessary, in other words, the judgment as to whether the picture numbers should be initialized is not influenced by the picture types that are to be decoded. Also, the processing of initializing picture numbers (PN) in step 14 can be performed before the processing of deleting all the pictures except for the pictures to be coded in the memory in step 13. It is possible not to code additional information by using special picture types (PicType) that include additional information indicating that all the pictures except for the pictures to be decoded are to be deleted from the memory for reference in decoding.

Figure 25:
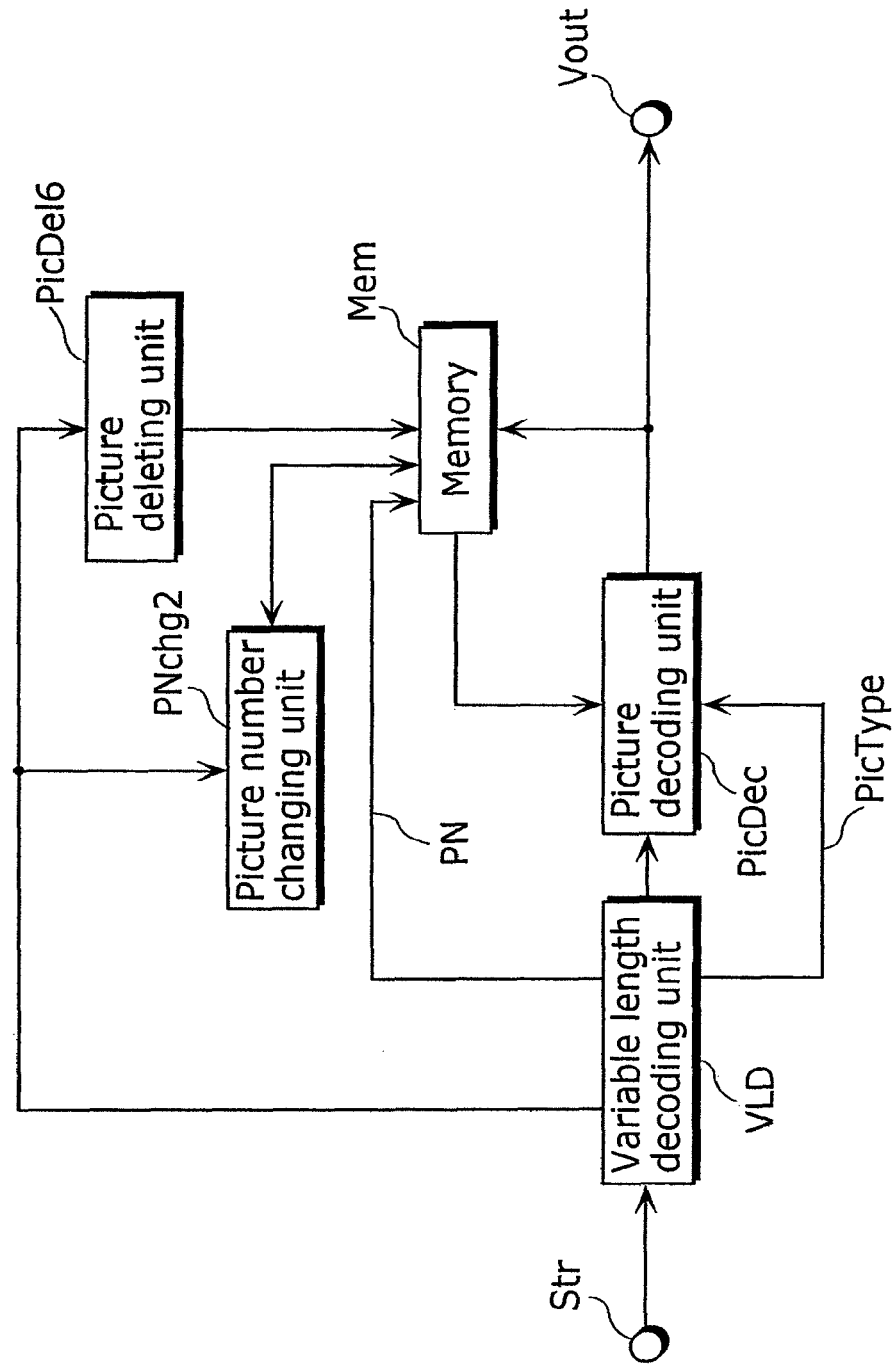
FIG. 25 is a block diagram showing a structure of a picture decoding apparatus realizing the decoding method in the twelfth embodiment.

FIG. 25 is a block diagram showing the structure of the picture decoding apparatus that realizes the decoding method of this twelfth embodiment.

A variable length decoding unit (VLD) decodes coded signals (Str), and outputs various information (such as an order for deleting the pictures that are stored in the reference picture memory (Mem), picture type information (PicType), picture numbers (PN), information for reassigning picture numbers (PN), and picture data.)

First, the order for deleting the pictures that are stored in the reference picture memory (Mem) which is obtained in the variable length decoding unit (VLD) (all picture delete information) is sent to a picture deleting unit (PicDel 6). Next, the picture deleting unit (PicDel 6) deletes the specified pictures that are stored in the reference picture memory (Mem).

Picture type information (PicType) which is obtained in the variable length decoding unit (VLD) is sent to a picture decoding unit (PicDec) so as to specify the decoding method.

Picture numbers (PN) which are obtained in the variable length decoding unit (VLD) are sent to the reference picture memory (Mem) to be used as picture numbers (PN) at the time of storing the decoded pictures in the picture decoding unit (PicDec).

All picture delete information obtained in the variable length decoding unit (VLD) is sent to the picture number changing unit (PNchg 2). The picture number changing unit (PNchg 2) reassigns (initializes) picture numbers (PN) of the pictures that are stored in the reference picture memory (Mem) according to the order. To be specific, after all the pictures except for the pictures to be decoded (S pictures) in the reference picture memory (Mem), the picture number changing unit (PNchg 2) reads out the picture numbers (PN) of the pictures that are stored in the reference picture memory (Mem), changes the values of the read-out picture numbers (PN) to "0", and writes the picture numbers (PN) in the reference picture memory (Mem).

Picture data obtained in the variable length decoding unit (VLD) are decoded using the decoding method based on the picture type which is shown by the picture type information (PicType) in the picture decoding unit (PicDec). In other words, P pictures and B pictures are decoded by referring to the pictures that are stored in the reference picture memory (Mem), whereas I pictures are decoded without referring to pictures that are stored in the reference picture memory. The decoded pictures obtained in this manner are stored in the reference picture memory (Mem) and are outputted as decoded picture signals (Vout).

The above-mentioned structure makes it possible to realize the picture decoding apparatus, to realize the picture decoding method shown in FIG. 23, and to provide a decoding apparatus with a high error-resistance.

The processing of the coding and the decoding methods shown in this twelfth embodiment makes the memory conditions in a plurality of streams identical after switching streams from a predetermined stream to another stream, and thus makes it possible to correctly specify the predetermined pictures in the memory even when reference pictures are required in intra-predictive coding and so on.

It is possible to change I pictures into special pictures at which streams can be reproduced by deleting all the pictures in the reference memory when using I pictures, while the above-mentioned embodiment explains that additional information (all picture delete information) and picture types (PicType) can be coded all at once. These special I pictures are called Instantaneous Decoder Refresh (IDR) pictures. An IDR picture is effective as a leading I picture of a Group of Pictures (GOP) because IDR pictures become a starting position of random access. By determining that all the pictures except for the current pictures in the memory are deleted and that picture numbers (PN) are initialized after coding the current pictures each time these IDR pictures are coded, there is no need to code additional information even when all the pictures except for the current pictures in the memory are deleted in the picture decoding apparatus. In this case, the picture decoding apparatus detects IDR pictures in the coded streams based on picture types, deletes all the pictures except for the current IDR pictures in the memory, and initializes picture numbers (PN) after coding and decoding the current IDR pictures even when any additional information is not coded each time IDR pictures are decoded.

Thirteenth Embodiment

Moreover, storing programs to realize the structures of the picture coding and the decoding methods shown in the above-mentioned embodiments on a storage medium such as a flexible disc makes it possible to easily perform the processing shown in the above-mentioned embodiments in an independent computer system.

FIG. 26 is an illustration concerning the storage medium for storing the program to realize the coding and the decoding methods shown in the first to the twelfth embodiments mentioned above in the independent computer systems.

Figure 26A:
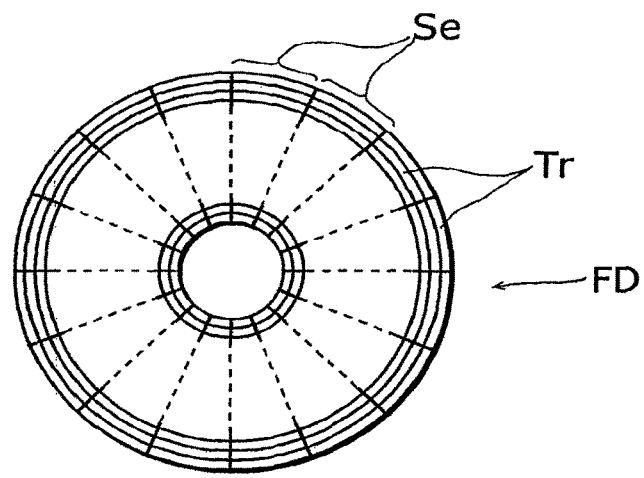
FIGS. 26A, 26B and 26C are illustrations relating to a recording medium storing a program for realizing the picture coding methods and picture decoding methods in the first to the twelfth embodiments using a computer system.
Figure 26B:
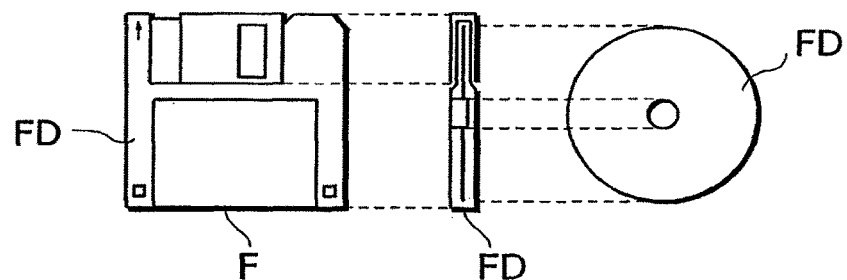

FIG. 26B shows a flexible disc and a front view and a cross-sectional view of the appearance of the flexible disc, and FIG. 26A shows an example of a physical format of a flexible disc as a recording medium body. A flexible disc (FD) is contained in a case F, a plurality of tracks (Tr) are formed concentrically on the surface of the disc from the periphery of the disc into the inner radius of the disc, and each track is divided into 16 sectors (Se) in the angular direction. Therefore, in the case of the flexible disc (FD) storing the above-mentioned program, the picture coding method and the picture decoding method, as the program, is recorded in an area which is allocated for it on the flexible disc (FD).

Figure 26C:
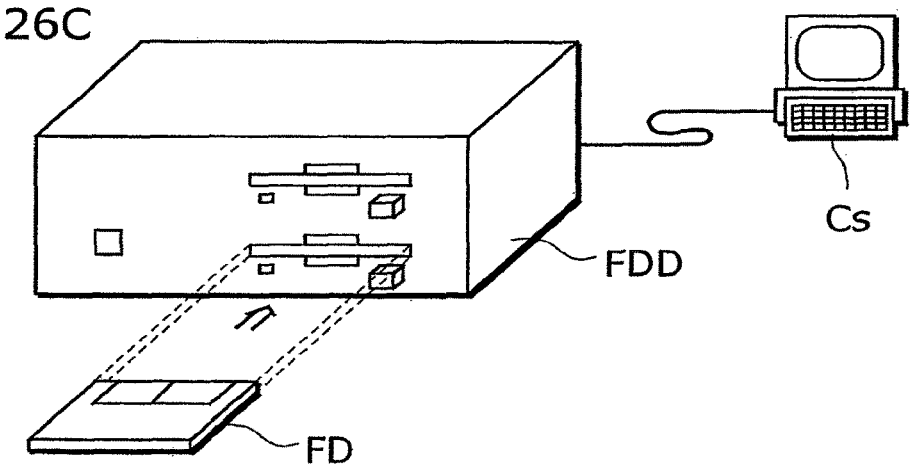

Also, FIG. 26C shows the structure for recording and reading out the program on the flexible disc (FD). When the program is recorded on the flexible disc (FD), the computer system (Cs) writes in the picture coding method or the picture decoding method as a program via a flexible disc drive (FDD). When the picture coding method and the decoding method mentioned above are constructed in the computer system by the program on the flexible disc, the program is read out from the flexible disc drive (FDD) and transferred to the computer system (Cs).

The above explanation is made by using a flexible disc as a recording medium, but the same processing can also be performed by using an optical disc. In addition, the recording medium is not limited to flexible discs and optical discs, in other words, any other medium which is capable of recording a program such as CD-ROMs, memory cards, and ROM cassettes can be used.

Here, the applications of the picture coding method and the picture decoding method shown in the above-mentioned embodiment and the system using them will be further explained.

Figure 27:
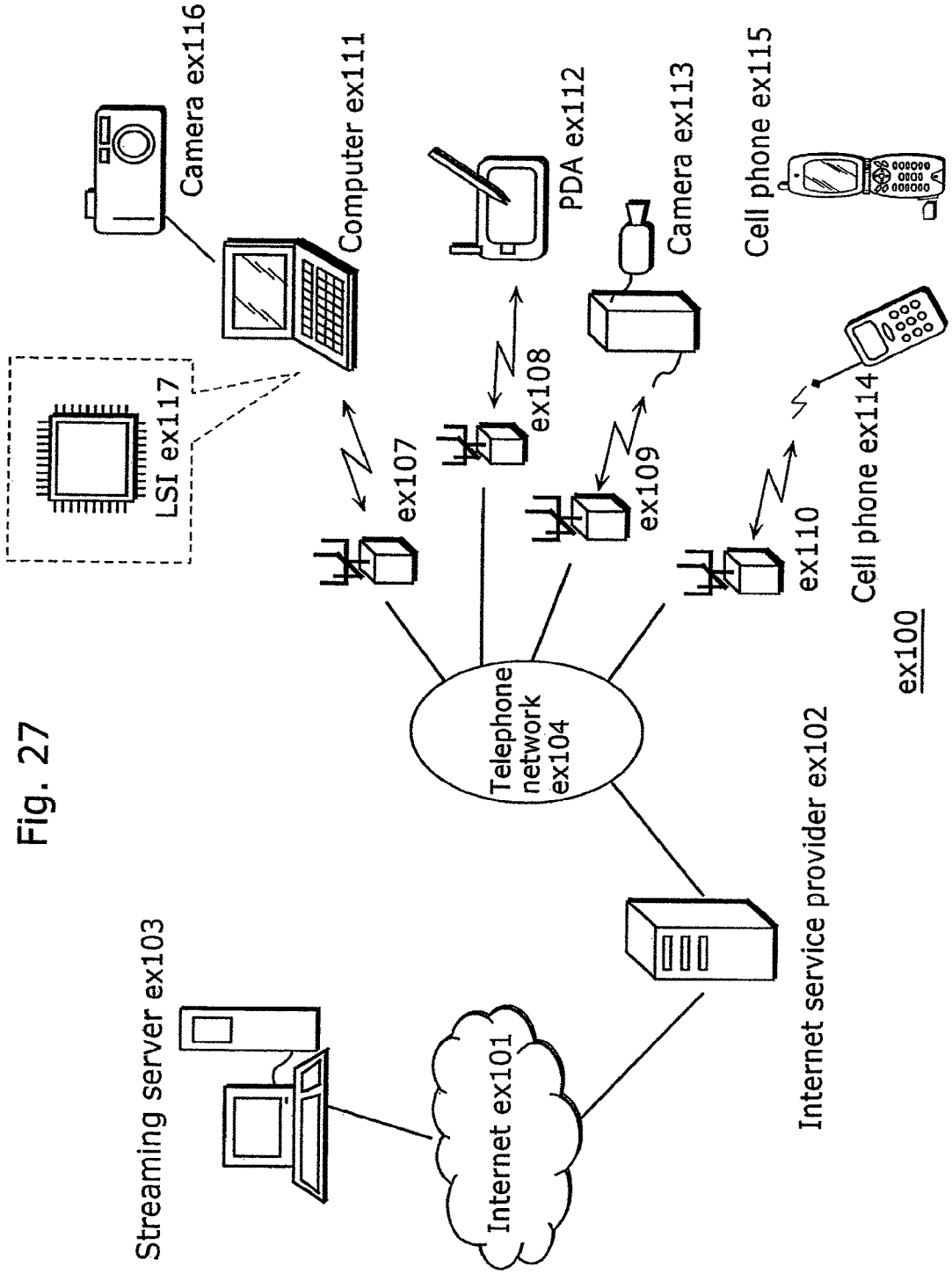
FIG. 27 is a block diagram showing the whole structure of a content supplying system realizing a content distribution service concerning the present invention.

FIG. 27 is a block diagram showing the overall configuration of a content supply system ex100 for realizing a content distribution service. The area for providing the communication service is divided into cells of desired sizes, and cell sites ex107-ex110 of fixed wireless stations are placed in the respective cells.

This content supply system ex100 is connected to apparatuses such as a computer ex111, a Personal Digital Assistant (PDA) ex112, a camera ex113, a cell phone ex114 and a cell phone with a camera ex115 via, for example, a combination of the Internet ex101, an Internet service provider ex102, a telephone network ex104 and cell sites ex107-ex110.

However, the content supply system ex100 is not limited to the configuration as shown in FIG. 27, and may be connected to a combination of any of the illustrated components. Also, each apparatus can be connected directly to the telephone network ex104, instead of being connected through the cell sites, as fixed radio stations ex107-ex110.

The camera ex113 is a apparatus which is capable of shooting video (moving pictures) such as a digital video camera. The cell phone can be a cell phone of a Personal Digital Communication (PDC) system, a Code Division Multiple Access (CDMA) system, a Wideband-Code Division Multiple Access (W-CDMA) system or a Global System for Mobile Communications (GSM) system, and a Personal Handy-phone system (PHS) or the like.

A streaming server ex103 is connected to the camera ex113 via the telephone network ex104 and the cell site ex109, which enables live distribution or the like using the camera ex113 based on the coded data that is transmitted from the user. Either the camera ex113 or the server for transmitting the data can code the shot (captured) data. Also, the moving picture data which is shot by the camera ex116 can be transmitted to the streaming server ex103 via the computer ex111. The camera ex116 is a apparatus which is capable of shooting still and moving pictures such as a digital camera. Either the camera ex116 or the computer ex111 can code the moving picture data. An LSI (large scale integrated circuit) ex117 which is included in the computer ex111 or the camera ex116 performs coding processing. Software for coding and decoding pictures can be integrated into any type of storage media (such as CD-ROMs, flexible discs and hard discs) that is a recording medium which is readable by the computer ex111 or the like. Furthermore, a cell phone with a camera ex115 can transmit the moving picture data. This moving picture data is the data that is coded by the LSI included in the cell phone ex115.

The contents supply system ex100 codes contents (such as a music live video) which are shot by users using the camera ex113, the camera ex116 or the like in the same manner as the above-mentioned embodiments and transmits the coded contents to the streaming server ex103, while the streaming server ex103 makes stream distribution of the contents data to the clients upon their request. The clients include the computer ex111, the PDA ex112, the camera ex113, the cell phone ex114 and so on which are capable of decoding the above-mentioned coded data. In the contents supply system ex100, the clients can thus receive and reproduce the coded data, and further can receive, decode and reproduce the data in real time so as to realize personal broadcasting in this way.

When each apparatus in this system performs coding or decoding, the picture coding apparatus or the picture decoding apparatus can be used, as shown in the above-mentioned embodiments.

A cell phone will be explained as an example of the apparatus.

Figure 28:
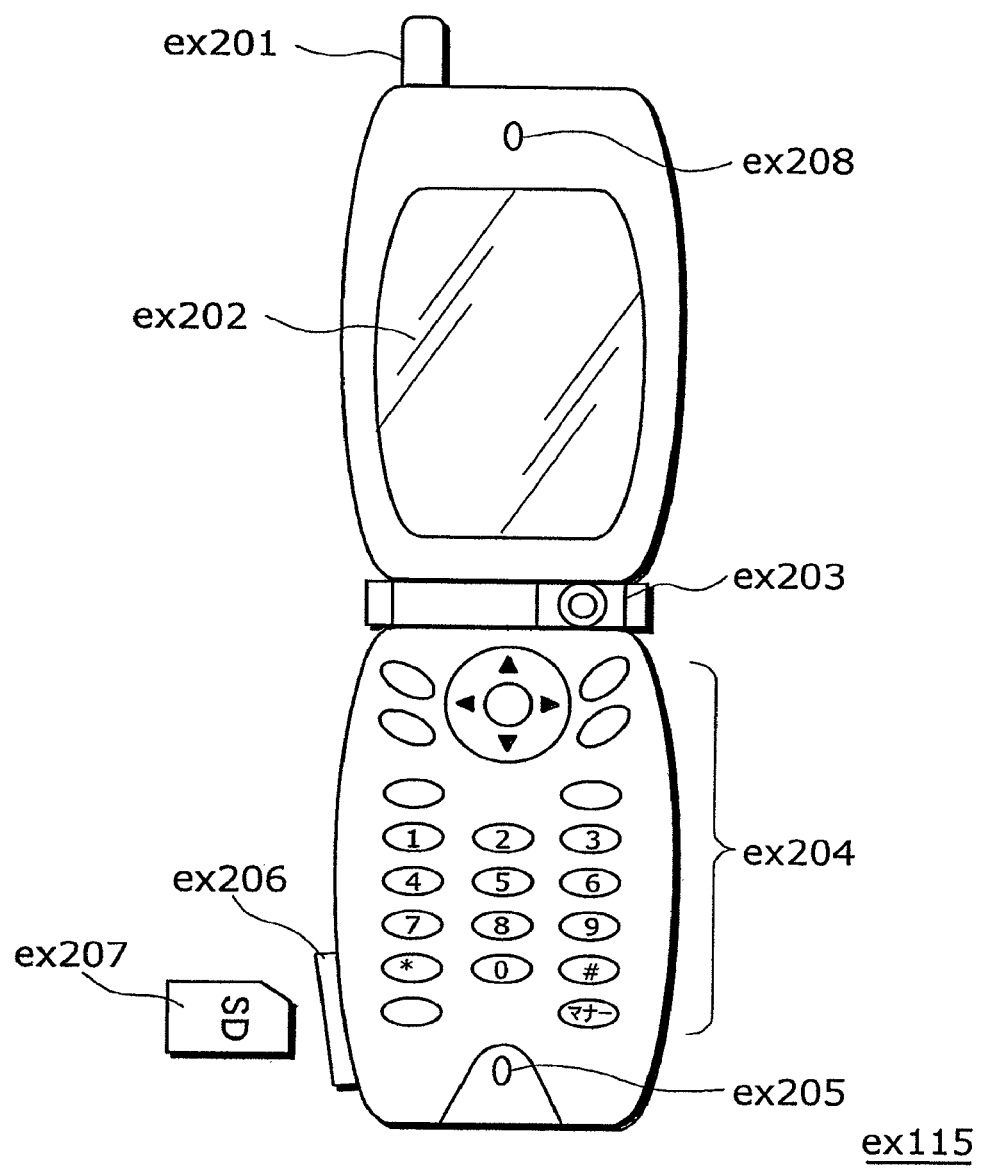
FIG. 28 is a diagram showing an example of cellular phones as relating to the present invention.

FIG. 28 is a diagram showing the cell phone ex115 using the picture coding method and the picture decoding method explained in the above-mentioned embodiments. The cell phone ex115 has an antenna ex201 for communicating with the cell site ex110 via radio waves, a camera unit ex203 which is capable of shooting moving and still pictures such as a CCD camera, a display unit ex202 such as a liquid crystal display for displaying the data that is obtained by decoding pictures and the like which are shot by the camera unit ex203 and received by the antenna ex201, a body unit including a set of operation keys ex204, a voice output unit ex208 such as a speaker for outputting voices (audio), a voice input unit 205 such as a microphone for inputting voices (audio), a storage medium ex207 for storing coded or decoded data such as data of moving or still pictures which are shot by the camera, data of received e-mail and data of moving or still pictures, and a slot unit ex206 for attaching the storage medium ex207 to the cell phone ex115. The storage medium ex207 is equipped with a flash memory element, which is a kind of Electrically Erasable and Programmable Read Only Memory (EEPROM) that is an electrically erasable and rewritable nonvolatile memory, in a plastic case such as SD cards.

Next, the cell phone ex115 will be explained with reference to FIG. 29. In the cell phone ex115, a main control unit ex311 for overall controlling each unit of the body unit including the display unit ex202 and operation keys ex204 is connected to a power supply circuit unit ex310, an operation input control unit ex304, a picture coding unit ex312, a camera interface (I/F) unit ex303, an Liquid Crystal Display (LCD) control unit ex302, a picture decoding unit ex309, a demultiplexing unit ex308, a recording and reproducing unit ex307, a modem circuit unit ex306 and a voice processing unit ex305 to each other via a synchronous bus ex313.

When a call-end key or a power key is turned ON by a user's operation, the power supply circuit unit ex310 supplies respective components with power from a battery pack so as to activate the digital cell phone with a camera ex115 for making it into a ready state.

In the cell phone ex115, the voice processing unit ex305 converts the voice signals that are received by the voice input unit ex205 in conversation mode into digital voice data under the control of the main control unit ex311 including a CPU, a ROM and a RAM, the modem circuit unit ex306 performs spread spectrum processing of the digital voice data, and the communication circuit unit ex301 performs digital-to-analog conversion and frequency transformation of the data so as to transmit it via the antenna ex201. Also, in the cell phone ex115, the communication circuit unit ex301 amplifies the data that is received by the antenna ex201 in the conversation mode and performs frequency transformation and analog-to-digital conversion for the data, the modem circuit unit ex306 performs inverse spread spectrum processing of the data, and the voice processing unit ex305 converts it into analog voice data so as to output it via the voice output unit 208.

Furthermore, when transmitting e-mail in the data communication mode, the text data of the e-mail which is inputted by operating the operation keys ex204 on the body unit is sent out to the main control unit ex311 via the operation input control unit ex304. In the main control unit ex311, after the modem circuit unit ex306 performs spread spectrum processing of the text data and the communication circuit unit ex301 performs digital-to-analog conversion and frequency transformation for the data, the data is transmitted to the cell site ex110 via the antenna ex201.

When picture data is transmitted in the data communication mode, the moving picture data which is shot by the camera unit ex203 is supplied to the picture coding unit ex312 via the camera interface unit ex303. When the picture data is not transmitted, it is also possible to display the picture data which is shot by the camera unit ex203 directly on the display unit 202 via the camera interface unit ex303 and the LCD control unit ex302.

The picture coding unit ex312, which includes the picture coding apparatus as explained in the present invention, compresses and codes the picture data that is supplied from the camera unit ex203 by using the coding method which is used for the picture coding apparatus as shown in the above-mentioned embodiments so as to transform the picture data into coded picture data, and sends the coded picture data out to the demultiplexing unit ex308. At this time, the cell phone ex115 sends out the voices which are received by the voice input unit ex205 during shooting by the camera unit ex203 to the demultiplexing unit ex308 as digital voice data via the voice processing unit ex305.

The demultiplexing unit ex308 multiplexes the coded picture data that is supplied from the picture coding unit ex312 and the voice data that is supplied from the voice processing unit ex305 by using a predetermined method, the modem circuit unit ex306 performs spread spectrum processing of the multiplexed data which is obtained as a result of the multiplexing, and the communication circuit unit ex301 performs digital-to-analog conversion and frequency transformation of the data for transmitting via the antenna ex201.

As for receiving data of a moving picture file which is linked to a Web page or the like in the data communication mode, the modem circuit unit ex306 performs spread spectrum processing of the data that is received from the cell site ex110 via the antenna ex201, and sends out the multiplexed data which is obtained as a result of the processing to the demultiplexing unit ex308.

In order to decode the multiplexed data that is received via the antenna ex201, the demultiplexing unit ex308 separates the multiplexed data into a bit stream of picture data and a bit stream of voice data, and supplies the current coded picture data to the picture decoding unit ex309 and the current voice data to the voice processing unit ex305, respectively, via the synchronous bus ex313.

Next, the picture decoding unit ex309, which includes the picture decoding apparatus as explained in the present invention, decodes the bit stream of picture data by using the decoding method corresponding to the coding method as shown in the above-mentioned embodiments so as to generate reproduced moving picture data, and supplies this data to the display unit ex202 via the LCD control unit ex302, and thus, the moving picture data which is included in a moving picture file that is linked to a Web page, for instance, is displayed. At the same time, the voice processing unit ex305 converts the voice data into analog voice data, and supplies this data to the voice output unit ex208, and thus, voice data which is included in a moving picture file that is linked to a Web page, for instance, is reproduced.

Figure 30:
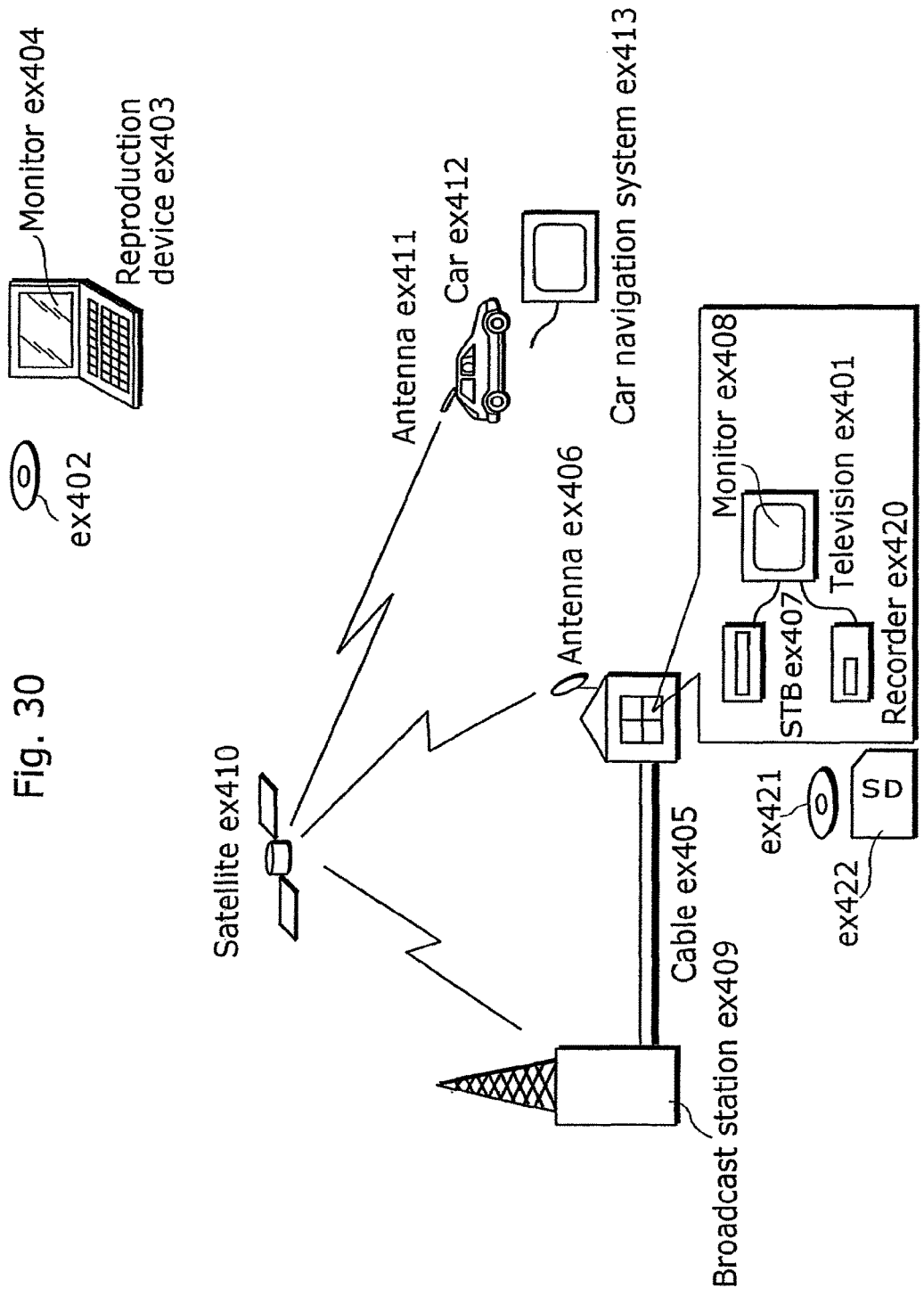
FIG. 30 is a diagram showing the structure of a digital broadcasting system concerning the present invention.

The present invention is not limited to the above-mentioned system, and at least one of the picture coding apparatus or the picture decoding apparatus in the above-mentioned embodiments can be incorporated into a digital broadcasting system as shown in FIG. 30. Such ground-based or satellite digital broadcasting has been in the news lately. More specifically, a bit stream of video information is transmitted from a broadcast station ex409 to a communication or a broadcast satellite ex410 via radio waves. Upon receipt of the bit stream, the broadcast satellite ex410 transmits radio waves for broadcasting, a home-use antenna ex406 with a satellite broadcast reception function receives the radio waves, and a television (receiver) ex401 or a set top box (STB) ex407 decodes and reproduces the bit stream. The picture decoding apparatus as shown in the above-mentioned embodiments can be implemented in the reproduction apparatus ex403 for reading off and decoding the bit stream recorded on a storage medium ex402 that is a recording medium such as a CD and a DVD. In this case, the reproduced moving picture signals are displayed on a monitor ex404. It is also conceived to implement the picture decoding apparatus in the set top box ex407 connected to a cable ex405 for a cable television or the antenna ex406 for satellite and/or ground-based broadcasting so as to reproduce them on a monitor ex408 of the television. The picture decoding apparatus may be incorporated into the television, instead of in the set top box ex407. Alternatively, a car ex412 having an antenna ex411 can receive signals from the satellite ex410 or the cell site ex107 for reproducing moving pictures on a display apparatus such as a car navigation system ex413.

Furthermore, the picture coding apparatus shown in the above-mentioned embodiments can code picture signals for recording on a recording medium. As a concrete example, there is a recorder ex420 such as a DVD recorder for recording picture signals on a DVD disc ex421 and a disc recorder for recording them on a hard disc. They can be recorded on an SD card ex422. If the recorder ex420 includes the picture decoding apparatus shown in the above-mentioned embodiment, the picture signals that are recorded on the DVD disc ex421 or the SD card ex422 can be reproduced for display on the monitor ex408.

Figure 29:
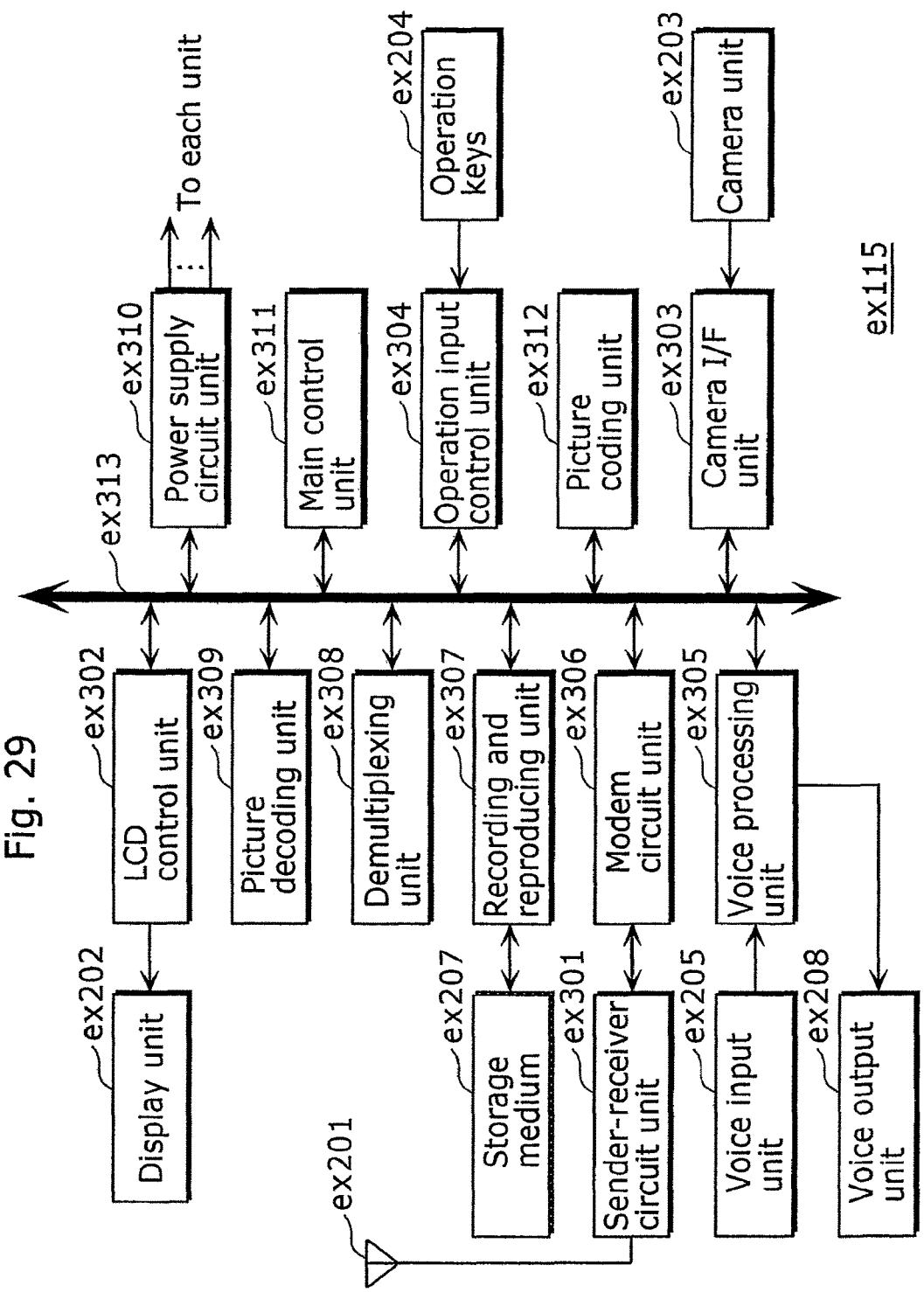
FIG. 29 is a block diagram showing the structure of the same cellular phones of FIG. 28.

Note that a conceivable structure of the car navigation system ex413 is the structure without the camera unit ex203, the camera interface unit ex303 and the picture coding unit ex312 that are existing components in FIG. 29. The same goes for the computer ex111, the television (receiver) ex401 and the like.

In addition, the following three types of implementations can be conceived for a terminal such as the above-mentioned cell phone ex114: a sending/receiving terminal which is implemented with both an encoder and a decoder, a sending terminal which is implemented with only an encoder, and a receiving terminal which is implemented with only a decoder.

As described above, it is possible to use the picture coding method or the picture decoding method in the above-mentioned embodiments in any of the above-mentioned apparatus and systems, and by using these methods, the effects explained in the above embodiments can be obtained.

From the present invention as described above, it will be obvious that the embodiments of the present invention may be varied in many ways. Such variations are not to be regarded as a departure from the spirit and scope of the present invention, and all such modifications which would be obvious to one skilled in the art are intended to be included within the scope of the following claims.

INDUSTRIAL APPLICABILITY

The picture coding apparatus of the present invention is useful as a picture coding apparatus which is installed in personal computers with communication functions, PDAs, digital broadcasting stations and cellular phones.

In addition, the picture decoding apparatus of the present invention is useful as a picture decoding apparatus which is installed in personal computers with communication functions, PDAs, STBs receiving digital broadcasting and cellular phones.

The invention claimed is:

1. A picture decoding method for decoding a bit stream, wherein the bit stream is generated by the following steps:
coding picture type information of an input picture;
coding a picture number of the input picture;
outputting all picture release information as a part of a coded signal of the input picture, the all picture release information being instructive to release all pictures stored in a memory; and
outputting the picture type information, the picture number and the all picture release information as the coded signal of the input picture,
said picture decoding method comprising:
obtaining picture type information of a target picture from the bit stream;
obtaining a picture number of the target picture from the bit stream;
determining whether all picture release information is included in the bit stream;
decoding the target picture to obtain a decoded picture, the decoded picture having a picture number;
when determined that the all picture release information is not included in the bit stream,
keeping the picture number of the decoded picture unchanged after the decoding of the target picture, and
decoding subsequent pictures following the target picture, the subsequent pictures having consecutive picture numbers following the picture number of the target picture,
when determined that the all picture release information is included in the bit stream and the all picture release information is not based on a picture type,
releasing all pictures stored in a decoder memory except for the decoded picture, after the decoding of the target picture, and prohibiting from using, as a reference picture, all the pictures except for the decoded picture in decoding of subsequent pictures, changing the picture number of the decoded picture to a different picture number, after the decoding of the target picture and after the releasing of all the pictures except for the decoded picture, and decoding subsequent pictures following the target picture, the subsequent pictures having consecutive picture numbers following the different picture number of the decoded picture, when determined that the all picture release information is included in the bit stream and the all picture release information is based on a picture type, releasing all pictures stored in the decoder memory except for the decoded picture, after the decoding of the target picture, and prohibiting from using, as a reference picture, all the pictures except for the decoded picture in decoding of subsequent pictures, and decoding subsequent pictures following the target picture, the subsequent pictures having consecutive picture numbers following the picture number of the decoded picture; and storing the decoded pictures in the decoder memory.

2. The picture decoding method according to claim 1, wherein all the pictures that are released are reference pictures.

3. A picture decoding apparatus which decodes a bit stream, wherein the bit stream is generated by the following units:

a picture type information coding unit for coding picture type information of an input picture;

a picture number coding unit for coding a picture number of the input picture;

a release information output unit for outputting all picture release information as a part of coded signal of the input picture, the all picture release information being instructive to release all pictures stored in a memory; and a coded signal output unit for outputting the picture type information, the picture number and the all picture release information as the coded signal of the input picture, said picture decoding apparatus comprising:

an obtainment unit operable to obtain picture type information of a target picture from the bit stream and operable to obtain a picture number of the target picture from the bit stream;

a determining unit operable to determine whether the all picture release information is included in the bit stream;

a decoding unit operable to decode the target picture to obtain a decoded picture, the decoded picture having a picture number;

when determined that the all picture release information is not included in the bit stream, the following units are performed:

a keeping unit operable to keep the picture number of the decoded picture unchanged after the target picture is decoded, and a decoding unit operable to decode subsequent pictures following the target picture, the subsequent pictures having consecutive picture numbers following the picture number of the target picture, when determined that the all picture release information is included in the bit stream of the target picture and the all picture release information is not based on a picture type, the following units are performed:

a releasing unit operable to release all pictures stored in a decoder memory except for the decoded picture, after the target picture is decoded;

a prohibiting unit operable to prohibit from using, as a reference picture, all the pictures except for the decoded picture in decoding of subsequent pictures;

a changing unit operable to change the picture number of the decoded picture to a different picture number, after the target picture is decoded and after all the pictures except for the decoded picture are released; and a decoding unit operable to decode subsequent pictures following the target picture, the subsequent pictures having consecutive picture numbers following the different picture number of the decoded picture, and when determined that the all picture release information is included in the bit stream and the all picture release information is based on a picture type, the following units are performed:

a releasing and prohibiting unit operable to release all pictures stored in the decoder memory except for the decoded picture, after the target picture is decoded, and operable to prohibit from using, as a reference picture, all the pictures except for the decoded picture in decoding of subsequent pictures; and a decoding unit operable to decode subsequent pictures following the target picture, the subsequent pictures having consecutive picture numbers following the picture number of the decoded picture; and a storing unit operable to store the decoded pictures in the decoder memory.

4. The picture decoding apparatus according to claim 3, wherein all the pictures that are released are reference pictures.

* * * * *